(12) United States Patent
Matsuo et al.

(10) Patent No.: US 10,876,931 B2
(45) Date of Patent: Dec. 29, 2020

(54) MACHINE TOOL AND METHOD FOR THE MACHINE TOOL

(71) Applicant: FANUC CORPORATION, Minamitsuru-gun, Yamanashi (JP)

(72) Inventors: Kenichi Matsuo, Yamanashi (JP); Masao Kamiguchi, Yamanashi (JP); Masato Yamamura, Yamanashi (JP); Shouichi Kawakami, Yamanashi (JP); Yutaka Igarashi, Yamanashi (JP); Takahiro Kouji, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 224 days.

(21) Appl. No.: 15/786,078

(22) Filed: Oct. 17, 2017

(65) Prior Publication Data

US 2018/0038773 A1 Feb. 8, 2018

Related U.S. Application Data

(63) Continuation of application No. 15/641,671, filed on Jul. 5, 2017.

(30) Foreign Application Priority Data

Jul. 8, 2016 (JP) ................................. 2016-136090

(51) Int. Cl.
*G06N 5/00* (2006.01)
*G06N 20/00* (2019.01)
(Continued)

(52) U.S. Cl.
CPC .......... *G01M 99/005* (2013.01); *G06N 5/022* (2013.01); *G06N 20/00* (2019.01); *G06Q 30/016* (2013.01); *G06N 5/00* (2013.01); *G06Q 10/0838* (2013.01)

(58) Field of Classification Search
CPC .... G01M 99/00; G01M 99/005; G06N 20/00; G06N 20/022; G06N 99/00; G06N 99/005; G06N 520/00; G06N 5/022; G06Q 30/016
See application file for complete search history.

(56) References Cited

U.S. PATENT DOCUMENTS 5,094,114 A * 3/1992 Date ........................ B23Q 5/40
192/141
6,065,136 A 5/2000 Kuwabara
(Continued)

FOREIGN PATENT DOCUMENTS

JP 5-11834 1/1993
JP 5-284573 10/1993
(Continued)

OTHER PUBLICATIONS

Notification of Reasons for Refusal dated Sep. 4, 2018 in corresponding Japanese Application No. 2016-136090.
(Continued)

*Primary Examiner* — Gregory J Toatley, Jr.
*Assistant Examiner* — Lynda Dinh
(74) *Attorney, Agent, or Firm* — Wenderoth, Lind & Ponack, L.L.P.

(57) ABSTRACT

A diagnostic service system includes one or plurality of factory monitoring systems configured to perform monitoring of at least one machine; a service center management device that is connected with the one or plurality of factory monitoring systems via a network; one or plurality of service centers that are connected with the service center management device; and a plurality of service terminals connected with one service center or each of the plurality of service centers via a service control. The plurality of service terminals are used by each responder capable of fault diagnosis of the machine, and when fault of a machine occurs, one of the
(Continued)

plurality of service terminals is selected via the service center management device and the one service center or plurality of service centers.

5 Claims, 26 Drawing Sheets

(51) Int. Cl.
*G01M 99/00* (2011.01)
*G06Q 30/00* (2012.01)
*G06N 5/02* (2006.01)
*G06Q 10/08* (2012.01)

(56) References Cited

U.S. PATENT DOCUMENTS

| | | | |
|---|---|---|---|
| 7,664,667 | B1 | 2/2010 | Ruppelt et al. |
| 8,014,898 | B2 | 9/2011 | Nishi et al. |
| 8,983,798 | B2 | 3/2015 | Han et al. |
| 2002/0149268 | A1* | 10/2002 | Yamada ............... B29C 45/5008 307/143 |
| 2006/0076840 | A1 | 4/2006 | Yamaguchi et al. |
| 2007/0101178 | A1 | 5/2007 | Jammu et al. |
| 2009/0006175 | A1 | 1/2009 | Maertz |
| 2011/0022641 | A1 | 1/2011 | Werth et al. |
| 2013/0332383 | A1* | 12/2013 | Anzai ................... G06Q 10/06 705/325 |
| 2014/0229125 | A1* | 8/2014 | Cheng ................. G01M 13/028 702/56 |
| 2015/0155806 | A1 | 6/2015 | Tsukamoto et al. |
| 2015/0354690 | A1* | 12/2015 | Cheng ................... G01N 29/14 73/587 |
| 2016/0008976 | A1 | 1/2016 | Nagatsuka et al. |
| 2017/0301152 | A1 | 10/2017 | Murata et al. |

FOREIGN PATENT DOCUMENTS

| | | |
|---|---|---|
| JP | 7-221134 | 8/1995 |
| JP | 10-222220 | 8/1998 |
| JP | 10-228311 | 8/1998 |
| JP | 11-119815 | 4/1999 |
| JP | 2001-236115 | 8/2001 |
| JP | 2001-271902 | 10/2001 |
| JP | 2001-334441 | 12/2001 |
| JP | 2003-177815 | 6/2003 |
| JP | 2003-242271 | 8/2003 |
| JP | 2003-271213 | 9/2003 |
| JP | 2004-295348 | 10/2004 |
| JP | 2005-32279 | 2/2005 |
| JP | 2007-118094 | 5/2007 |
| JP | 2008-538836 | 11/2008 |
| JP | 2009-116745 | 5/2009 |
| JP | 2010-102416 | 5/2010 |
| JP | 2011-45986 | 3/2011 |
| JP | 2014-067324 | 4/2014 |
| JP | 2014-225237 | 12/2014 |
| KR | 2006-0020878 | 3/2006 |

OTHER PUBLICATIONS

Office Action dated Nov. 2, 2018 in U.S. Appl. No. 15/641,671.
Office Action dated Nov. 6, 2018 in Japanese Application No. 2016-187269.
Office Action dated Feb. 24, 2020 in corresponding U.S. Appl. No. 16/711,901.
Office Action dated Mar. 18, 2020 in corresponding U.S. Appl. No. 15/641,671.
Office Action dated May 24, 2019 in U.S. Appl. No. 15/641,671.
Office Action dated Aug. 3, 2020 in U.S. Appl. No. 16/711,901.
Notification of Reasons for Refusal dated Jun. 23, 2020 in the JP Patent Application No. 2019-078497.
Notification of Reasons for Refusal dated Nov. 4, 2020 in JP Patent Application No. 2019-198140

* cited by examiner

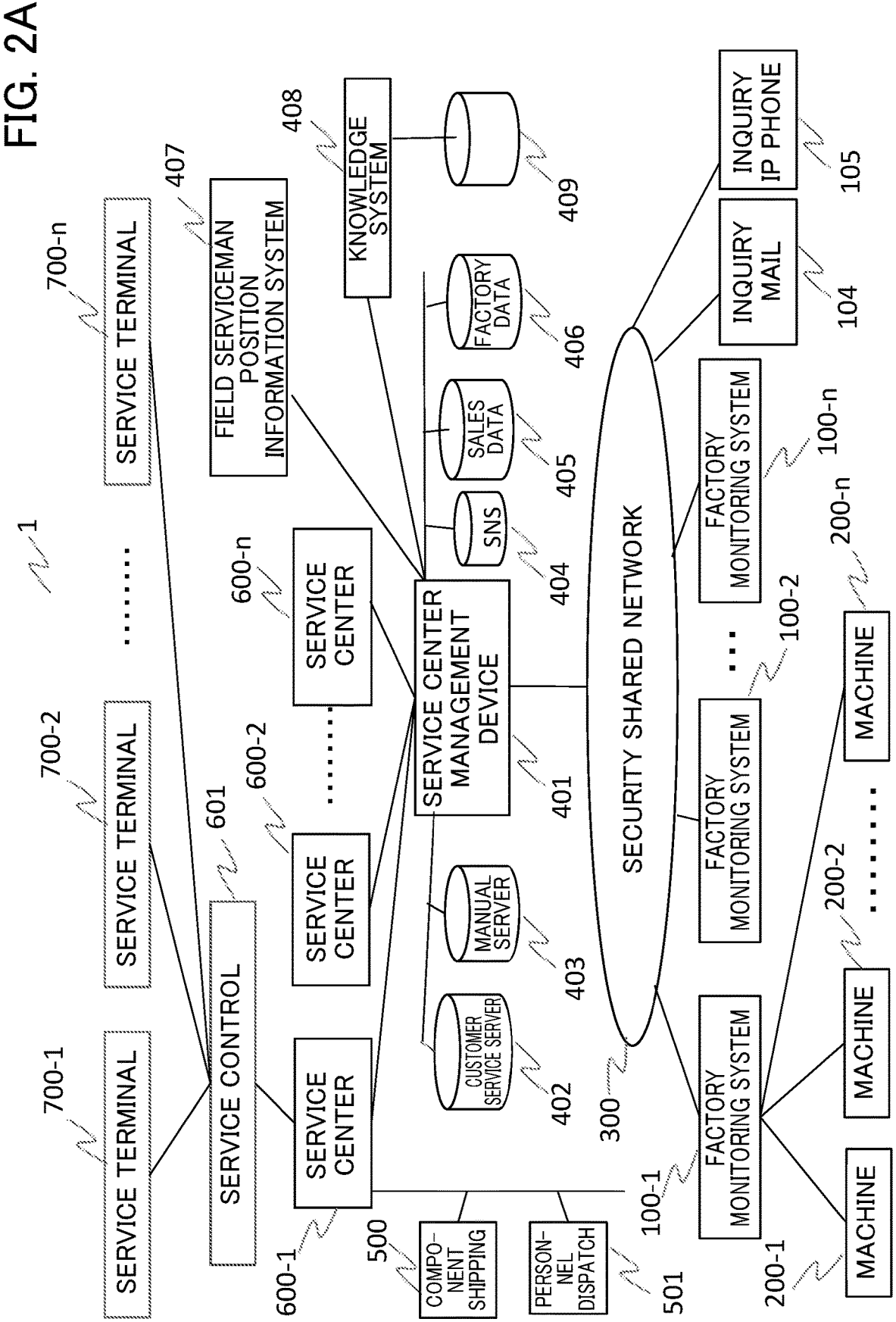

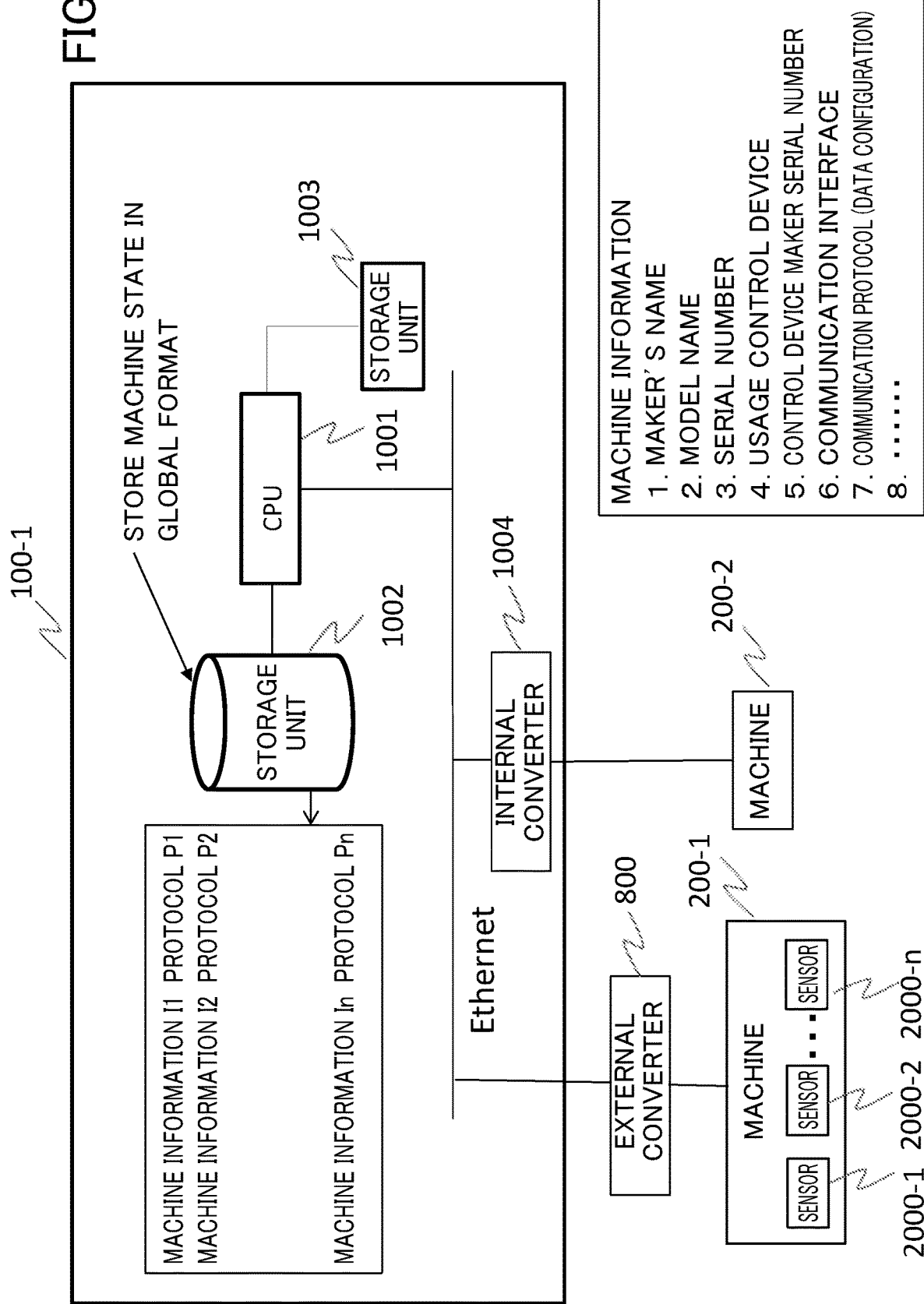

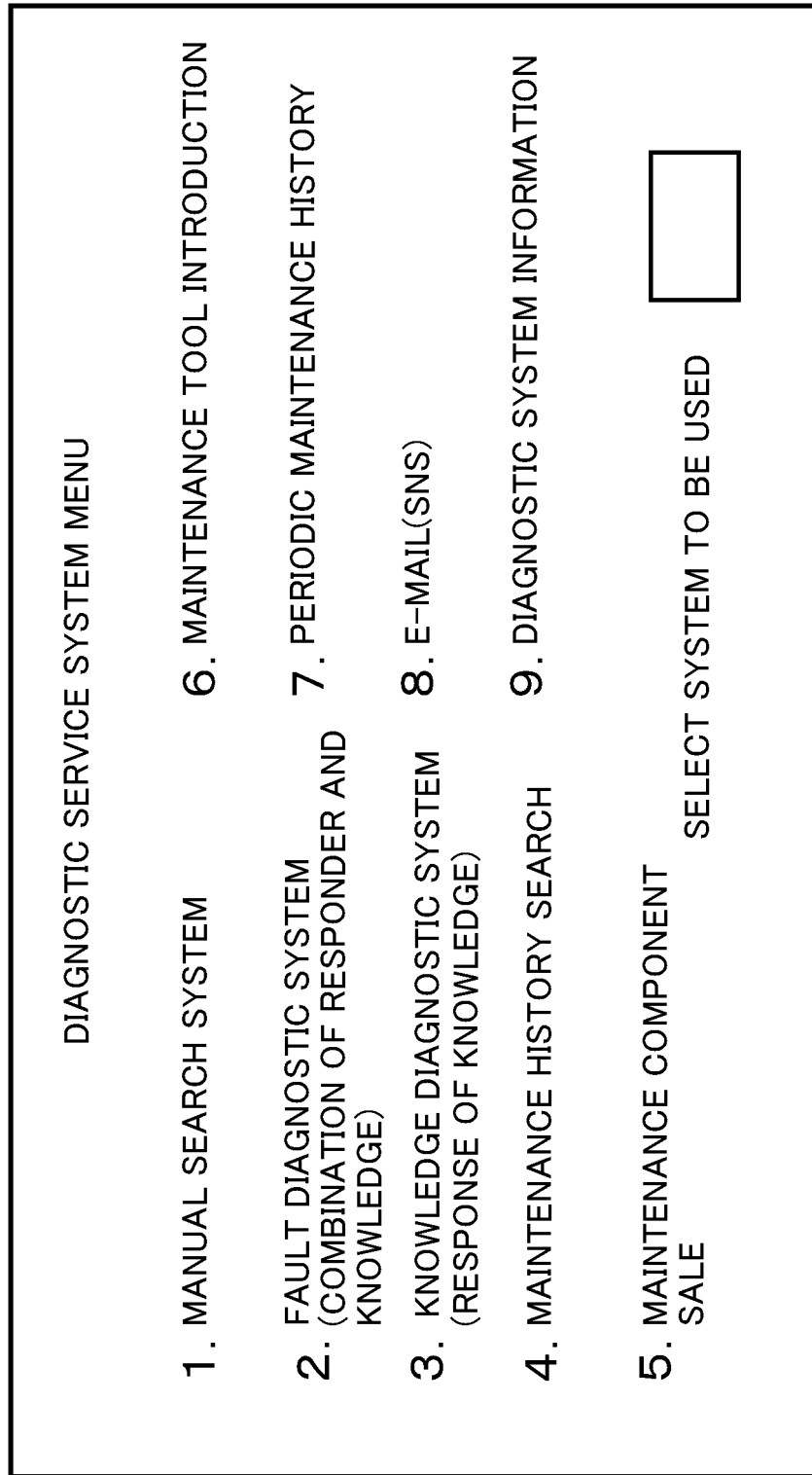

FIG. 8

PLEASE INPUT USER ID

AS1201

PLEASE INPUT PASSWORD

PLEASE CONFIRM COMPANY NAME AND ADDRESS

COMPANY NAME    XX COMPANY

ADDRESS    XX PREFECTURE, XX CITY, XX TOWN

9. CONFIRM DIAGNOSTIC SYSTEM INFORMATION

RESPONDER ID1243 : 2016.7.1 09:10

THANK YOU FOR INQUIRY

1. INQUIRY CONTENTS

"ACCELERATED TOOL WEAR, BLADE EDGE CHIPPED"

2. REGARDING HANDLING OF PRESENT CASE

FOLLOWING ITEMS SEARCHED AS FAILURE FACTORS FROM CASE EXAMPLE SEARCH AND VIBRATION DATA OF CORRESPONDING MACHINE

1) TOOL VIBRATING AND WEAR PROGRESSING, BY DECLINE IN CLAMPING FORCE OF TOOL
2) CORE FLUCTUATION DUE TO WEAR OF SPINDLE SHAFT

DISPATCH OF SERVICE PERSONNEL IS REQUIRED IN REPAIR

MEASUREMENT TOOL  OK

COMPONENT
BOLT            OK
SPINDLE SHAFT   OK

SERVICE PERSONNEL  DISPATCHABLE   JULY 1ST  2 PM  CAN DEPART

ESTIMATED COST  XX YEN

PLEASE SELECT ARRANGEMENT IN CASE OF APPROVING DISPATCH
PLEASE CONFIRM ONE HOUR BEFORE DISPATCH

ARRANGE-MENT

END

FIG. 13

EVALUATION OF RESPONSE FROM DIAGNOSTIC SYSTEM

PLEASE INPUT EVALUATION FOR RESPONSE

1. EXCELLENT
2. GOOD
3. NORMAL
4. SLIGHTLY DIFFICULT
5. IMPROVEMENT NEEDED

FIG. 18

```
DIAGNOSIS REQUEST(HISTORY SEARCH)

USER NAME  XX COMPANY
MACHINE NUMBER  20  MACHINE MODEL  * * * *

1. 2016.5.10  SPINDLE VIBRATION

PAST DISPLAY  | 1 |  YEAR
```

FIG. 19

```
DIAGNOSIS REQUEST(KEYWORD SEARCH)

KEYWORD        | TOOL WEAR |

RECEPTION DATE AND TIME   CONTENTS      SOLVED
1. 2016.3.10                 TOOL WEAR     O

[END]          NUMBER  [ ]      [SELECT]
```

FIG. 20

DIAGNOSIS REQUEST(KNOWLEDGE)

| | RECEPTION DATE AND TIME | CONTENTS | SOLVED |
|---|---|---|---|
| 1. | 2016.3.10 | TOOL WEAR | ○ |
| 2. | 2015.9.10 | TOOL WEAR OF EDGE | ○ |
| 3. | 2011.1.10 | TOOL VIBRATING | ○ |

NUMBER ☐  [SELECT]

FIG. 21

DIAGNOSIS REQUEST(SENSOR)

| | |
|---|---|
| MAXIMUM VIBRATION VALUE IN THIS PERIOD | 20.0m/S2 |
| MACHINE SPECIFICATIONS | 05,0m/S2 |
| MAXIMUM VIBRATION AMPLITUDE IN THIS PERIOD | 0.03mm |
| MACHINE SPECIFICATIONS | 0.01mm |

DATA DISPLAY PERIOD

START 2016.5.1, 20:00 — 2016.7.1, 3:00

[END]  [EXECUTE]

FIG. 22

```
DIAGNOSIS REQUEST(COMPONENT SEARCH)

MEASUREMENT TOOL      ON

COMPONENT
   BOLT               ON
   SPINDLE SHAFT      ON
```

FIG. 23

```
DIAGNOSIS REQUEST(SERVICEMAN)

DISPATCHABLE SERVICEMAN

1.  AAAAA          10:00—
2.  BBBBB          10:00—
```

MACHINE TOOL AND METHOD FOR THE MACHINE TOOL

This application is based on and claims the benefit of priority from Japanese Patent Application No. 2016-136090, filed on 8 Jul. 2016, the content of which is incorporated herein by reference.

BACKGROUND OF THE INVENTION

Field of the Invention

The present invention relates to a diagnostic service system and diagnostic method using a network.

Related Art

As a representative configuration example of a conventional diagnostic service system using a network, there are the three systems shown in FIGS. 1A, 1B and 1C. In the system shown in FIG. 1A, machines 11, 12 and 13 send an operating status directly, or through a network, to a diagnosis center 20, and perform fault diagnosis by considering the status of the machines 11, 12 and 13. As patent documents describing this system, there are Patent Documents 1, 2 and 3, for example. In the system shown in FIG. 1B, a management device 30 monitors the operating status of the machines 11, 12 and 13, and the diagnosis center 20 performs diagnosis by also considering log data accumulated in the management device 30 during alarm. As a patent document describing this system, there is Patent Document 4. In the system shown in FIG. 1C, this system has a management device 31 including an inquiry system, and a diagnosis center 21 including an inquiry system, an interview system is embedded in the management device 31, and the diagnosis center 21 performs diagnosis in accordance with status information made using this interview system and the log data accumulated in the management system 31, during alarm occurrence. As patent documents describing this system, there are Patent Documents 5 and 6, for example.

Patent Document 1: Japanese Unexamined Patent Application, Publication No. H10-228311
Patent Document 2: Japanese Unexamined Patent Application, Publication No. H05-284573
Patent Document 3: Japanese Unexamined Patent Application, Publication No. H11-119815
Patent Document 4: Japanese Unexamined Patent Application, Publication No. H10-222220
Patent Document 5: Japanese Unexamined Patent Application, Publication No. H05-11834
Patent Document 6: Japanese Unexamined Patent Application, Publication No. 2001-236115

SUMMARY OF THE INVENTION

The three conventional systems can rapidly perform grasping of failure contents due to being able to use the actual machine operation data or history data during analysis of fault contents during alarm occurrence. However, in an actual service center, a plurality of failures often occurs simultaneously and how to rapidly process depends on the actual application system. More specifically, a technique whereby failure contents are known in a short time, and even when component replacement is necessary, delivers to the customer in the shortest time, and a system for quickly dispatching a field serviceman and repairing the fault, are important. In addition, a system that comprehensively provides the required items in the maintenance of machines is important.

Furthermore, since these systems are usually operated by a security system for paying members, what kind of user merits there are other than failure diagnosis is important for improving the satisfaction of members. For this reason, construction of a system that somehow makes use of user fault data and diagnostic data accumulated by network for the user is important.

In order to solve the above such problems, the present invention has an object of providing a comprehensive and efficient diagnostic service system and diagnosis method for a diagnostic service system using a network, and providing a diagnostic service system and diagnosis method that improve the level of user satisfaction.

According to a first aspect of the present invention, a diagnostic service system includes: one or plurality of factory monitoring systems that perform monitoring of at least one machine; a service center management device that is connected with the one or plurality of factory monitoring systems via a network; one or plurality of service centers that are connected with the service center management device; and a plurality of service terminals connected with the one service center or each of the plurality of service centers via a service control, in which the plurality of service terminals are respectively used by responders capable of fault diagnosis of the machine, and one of the plurality of service terminals, in a case of failure of the machine occurring, is selected via the service center management device and the one service center or the plurality of service centers.

According to a second aspect of the present invention, in the diagnostic service system as described in the first aspect, one of the plurality of service terminals may be selected via the service center management device and the one service center or the plurality of service centers, when execution of a fault diagnostic system is selected from a plurality of items on a diagnostic service system menu by way the factory monitoring system.

According to a third aspect of the present invention, in the diagnostic service system as described in the second aspect, one of the plurality of service terminals may be selected via the service center management device and the one service center or the plurality of service centers, when an inquiry mail or inquiry telephone call related to failure of the machine is received, and fault diagnosis of the machine is necessary.

According to a fourth aspect of the present invention, in the diagnostic service system as described in the second or third aspect, the service center management device may be connected with a knowledge system that searches failure know-how related to the machine, and a manual server that accumulates manuals related to the machine, and the plurality of items on the diagnostic service system menu may include an item of knowledge diagnosis using the knowledge system, and an item of manual search that searches the manual server.

According to a fifth aspect of the present invention, in a membership system using the diagnostic service system as described in any one of the second to fourth aspects, the diagnostic service system menu is offered for a fee.

According to a sixth aspect of the present invention, in the diagnostic service system as described in the second or third aspect, the service center management device may be connected with a knowledge system that searches failure know-how related to the machine and a customer service server that accumulates at least fault history, and the customer service server and the knowledge system may be usable from the factory monitoring system and the service terminal.

According to a seventh aspect of the present invention, in a diagnostic method of a diagnostic service system that includes: one or plurality of factory monitoring systems that performs monitoring of at least one machine; a service center management device that is connected with the one or plurality of factory monitoring systems via a network; one or plurality of service centers that is connected with the service center management device; and a plurality of service terminals that is connected with the one service center or each of the plurality of service centers via a service control, wherein the plurality of service terminals is used by a responder capable of fault diagnosis of the machine, the method includes: selecting one of the plurality of service terminals via the service center management device and the one service center or the plurality of service centers, when execution of a fault diagnostic system is selected from a plurality of items on a diagnostic service system menu by way of the factory monitoring system.

According to an eighth aspect of the present invention, in the diagnostic method as described in the seventh aspect, the service center management device receives an inquiry mail or inquiry telephone call related to failure of the machine, and if fault diagnosis of the machine is necessary, one of the plurality of service terminals may be selected via the service center management device and the service center.

According to a ninth aspect of the present invention, in the diagnostic method as described in the seventh or eighth aspect, the service center management device may be connected with a knowledge system that searches failure know-how related to the machine, and a manual server that accumulates manuals related to the machine, and the service center management device, in a case of execution of knowledge diagnosis being selected from a plurality of items on the diagnostic service system menu, may perform the knowledge diagnosis using the knowledge system, and in a case of executing a manual search to search the manual server, may perform the manual search using the manual server.

According to a tenth aspect of the present invention, in the diagnostic method as described in the seventh or eighth aspect, the service center management device may be connected with a knowledge system that searches failure know-how related to the machine, and a customer service server that accumulates at least fault history data, and the customer service server and the knowledge system may be usable from the factory monitoring system and the service terminal.

According to the present invention, it is possible to obtain comprehensive and efficient diagnostic service system and diagnostic method, as well as being able to obtain a diagnostic service system and diagnostic method which improve the level of user satisfaction.

BRIEF DESCRIPTION OF THE DRAWINGS

FIG. 2A is a block diagram showing the configuration of an embodiment of a diagnostic service system according to the present invention;

FIG. 3 is a block diagram showing the configurations of machine and a factory monitoring system;

FIG. 7 is a view showing a screen of a diagnostic service system menu;

FIG. 8 is a view showing an authentication screen;

FIG. 12 is a view showing details of a diagnostic system information confirmation screen;

FIG. 13 is a view showing an evaluation information input screen relative to a response from the diagnostic system;

FIG. 18 is a view showing a screen of a history search;

FIG. 19 is a view showing a screen of a keyword search;

FIG. 20 is a view showing a screen of a knowledge search;

FIG. 21 is a view showing a screen of sensor information;

FIG. 22 is a view showing a screen of component information;

FIG. 23 is a view showing a screen of field serviceman information; and

DETAILED DESCRIPTION OF THE INVENTION

Figure 1A:
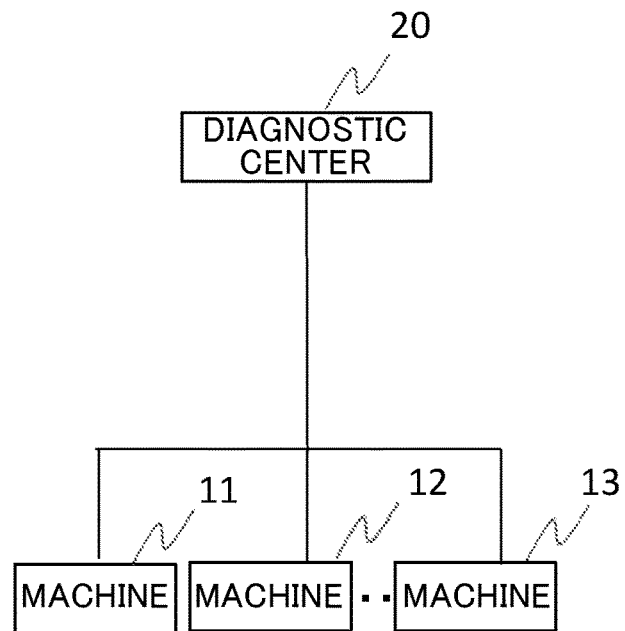
FIG. 1A is a block diagram showing an example of a diagnostic service system including machines and diagnosis center.
Figure 1B:
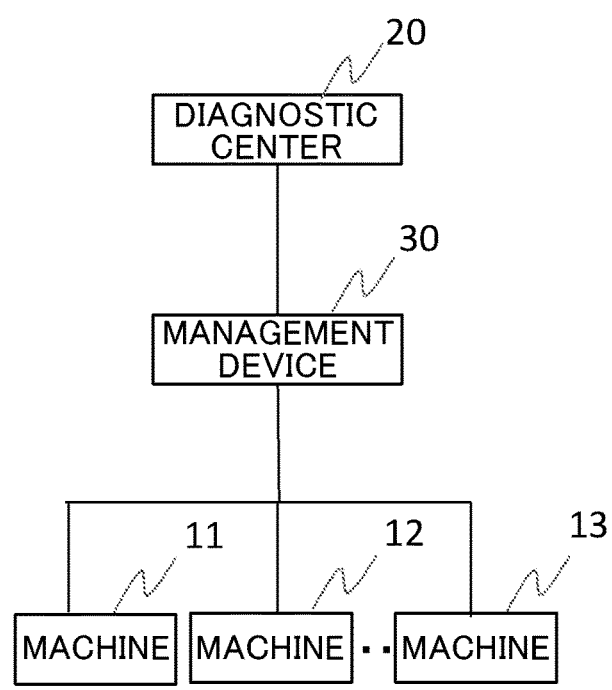
FIG. 1B is a block diagram showing an example of a diagnostic service system including machines, a management device and diagnosis center.
Figure 1C:
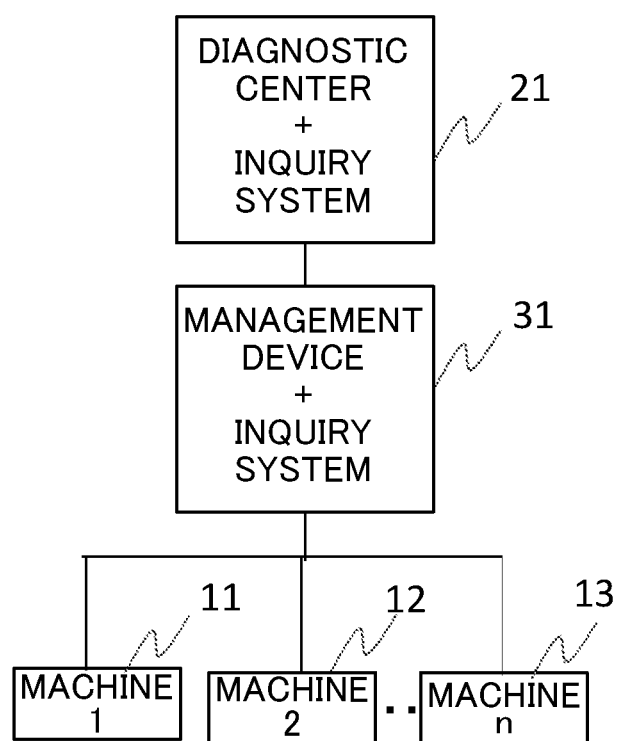
FIG. 1C is a block diagram showing an example of a diagnostic service system including machines, a management device, a diagnosis center and inquiry system.

First, prior to explanation of embodiments of the present invention, the background for arriving at the present invention will be explained taking an example of a diagnostic service system related to failure in a machine tool arranged in a factory. As causes of alarm occurrence in a machine tool having an inquiry from a user, mainly there are the following three patterns (1), (2) and (3).

(1) Cause is a case of being failure of a specific part of the machine tool. For example, a case of wear on a ball screw in the machine tool including mechanism that converts rotational motion into linear motion by a ball screw, etc. can be exemplified.
(2) Cause is a case of the machine tool machining at more severe machining conditions than the supposed machining conditions (case of appearance seeming to be failure, but not being a failure based on fault, etc. of a specific part of the machine). For example, a case of machining by exceeding the rated torque of the motor can be exemplified.
(3) Cause is a case of wearing of the machine tool (for example, cutting tool, etc.) (case of appearance seeming to be failure, but not being a failure based on fault, etc. of a specific part of the machine).

Then, the handling thereof differs according to the cause of the alarm occurrence. More specifically, in the case of the above-mentioned pattern (1), it is necessary to perform specification of the failed component, and specification such as whether the cause of this alarm occurrence is failure of the control system, or is failure of a maker system (so-called category), etc. By specifying these, it is possible to select and dispatch the most suitable component and most suitable field serviceman.

In the case of the above-mentioned pattern (2), it is possible to resolve the alarm by the user specifying the machining conditions, and reviewing the machining conditions. Therefore, the ordering of components for the machine tool and dispatching of a field serviceman are unnecessary. In the case of the above-mentioned pattern (3), it is possible to resolve the alarm by the user finding the defect in the machining tool, and replacing this machining tool. Therefore, the ordering components for the machine tool and dispatching of a field serviceman are unnecessary.

In the cases of the above-mentioned patterns (2) and (3), it is preferable to provide an environment in which the user can quickly resolve errors without requiring to dispatch a skilled technician. In addition, in the case of the above-mentioned pattern (1), i.e. in the case of a failure occurring in a specific part of the machine tool, it becomes possible to quickly arrange the most suitable component and dispatch the most suitable field serviceman. In the case of an alarm occurring in a machine tool arranged within the factory of a user in this way, in order to quickly ascertain the cause of the alarm occurrence, it is important to provide an integrated system (hereinafter also referred to as "diagnostic service system") that can make the appropriate measures based on the cause of the alarm occurrence. For this reason, in the diagnostic service system, a factory monitoring system is important that continually collects centrally the data relating to the machines of a plurality of makers installed in the factory every predetermined period, and can store and manage the data so as to be able to effectively utilize the stored data as necessary.

By providing a factory monitoring system, it becomes possible to guess the cause of the alarm occurrence in the following way, in the case of a machine tool including a mechanism that converts rotational motion into linear motion by the aforementioned ball screw, etc. In the case of the above-mentioned pattern (1), for the case of wear of the ball screw, the status of a used stroke of the ball screw and load status are established from the characteristic diagram of FIG. 6B described later, based on the information stored and managed in the factory monitoring system. By comparing this data with the data of a case of operating the full stroke in delivery inspection at the factory, for example, it is possible to guess the wear state of a specific part in the ball screw.

In the case of the above-mentioned pattern (2), in the case of machining by exceeding the rated torque of a motor, for example, the factory monitoring system is configured so as to store, at fixed intervals, the machine doing machining and machining program, the motor command speed, motor current, and information of various sensors during machining, for all machining. By doing this, it is possible to grasp the status of machining that exceeds the rated torque of the motor in which the motor current is being used during machining, from the relationship between the command speed and motor current during factory delivery, and the relationship between command speed and motor current during machining. It is possible to grasp the motor being used from recording during delivery.

Figure 24:
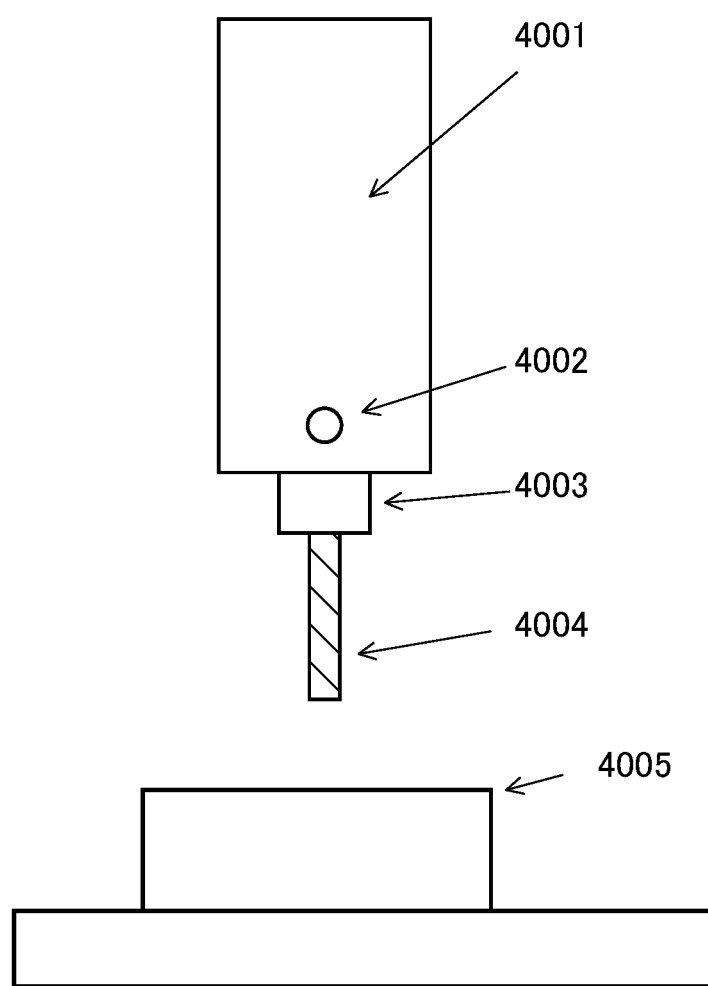
FIG. 24 is a view showing an example of a machine tool.

In the case of the above-mentioned pattern (3), in a machine such as that in FIG. 24 described later, for example, the factory monitoring system is configured so as to store, at fixed intervals, the vibrations during machining by equipping vibration sensors at locations that can detect the status of the machining tool, in addition to the machine doing machining and machining program, and motor command speed, motor current and information of various sensors, during machining. By doing this, the factory monitoring system can compare the vibrations during machining with thresholds. More specifically, the factory monitoring system, by comparing between a waveform when machining without trouble in the past and the current waveform, for example, can compare at higher frequency than comparing with a threshold created with a sample of small N value, and is able to guess the wear of the machining tool.

Figure 4:
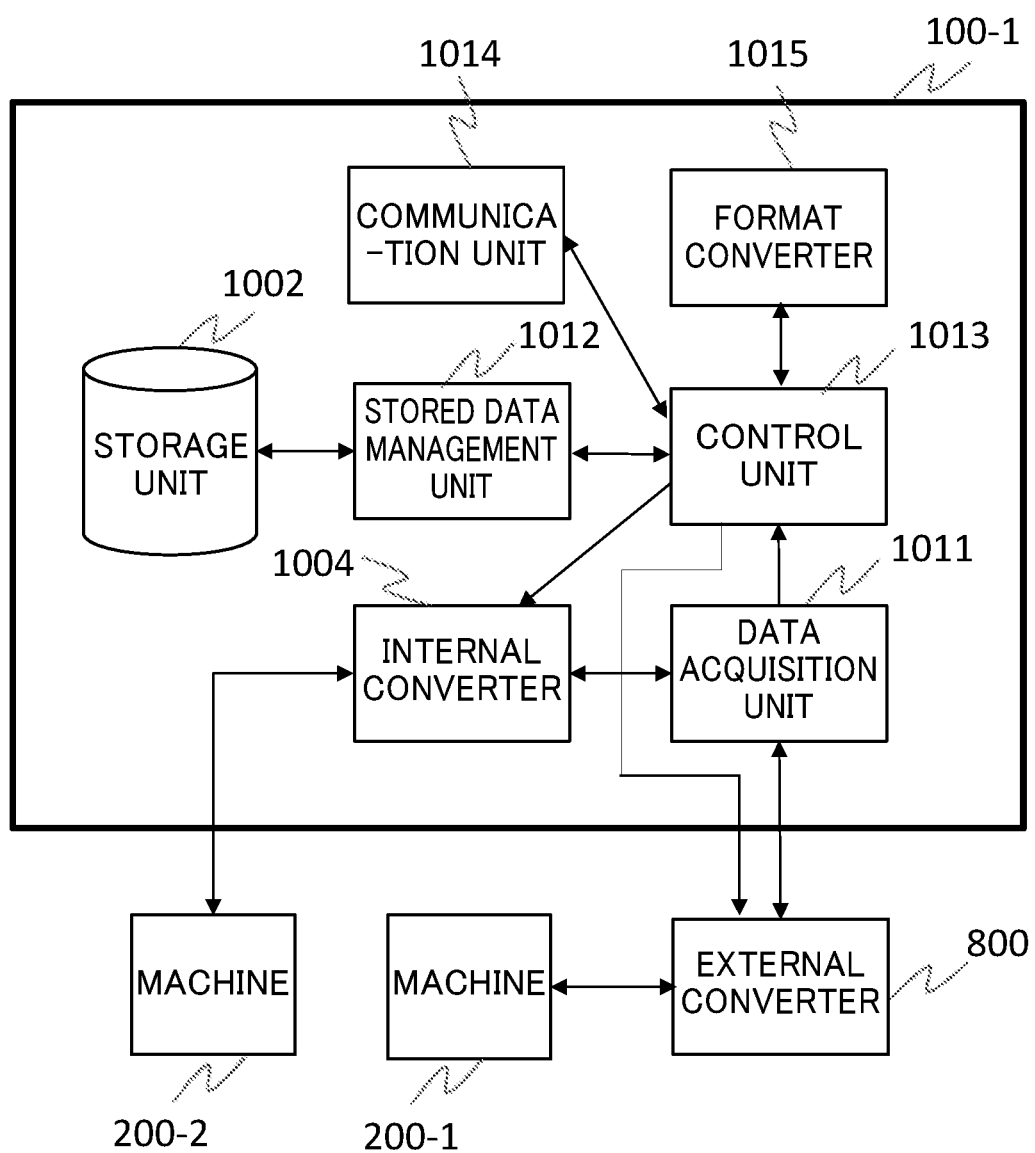
FIG. 4 is a block diagram showing the configurations of a machine and a factory monitoring system.
Figure 5:
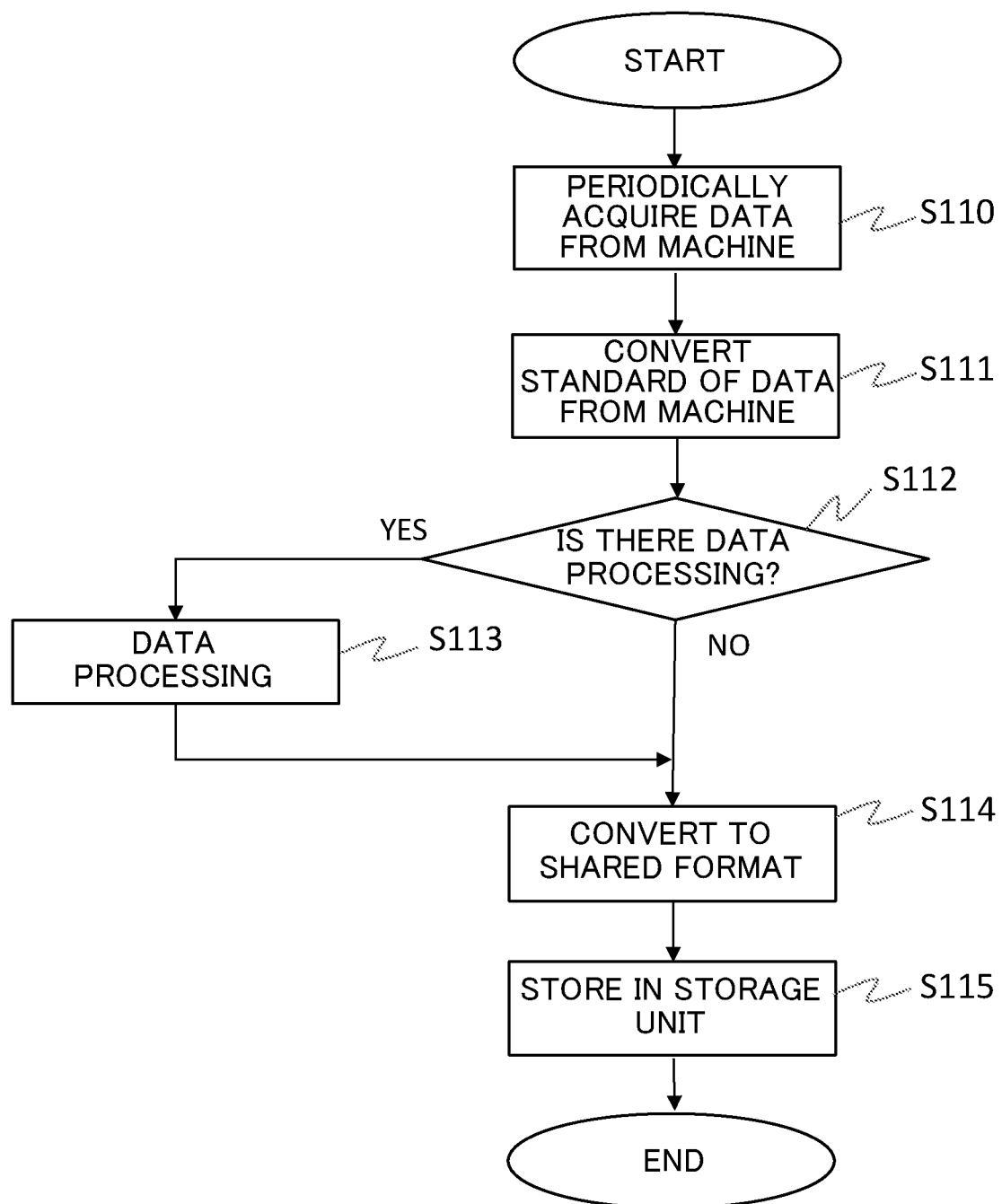
FIG. 5 is a flowchart showing operations of a factory monitoring system.
Figure 6A:
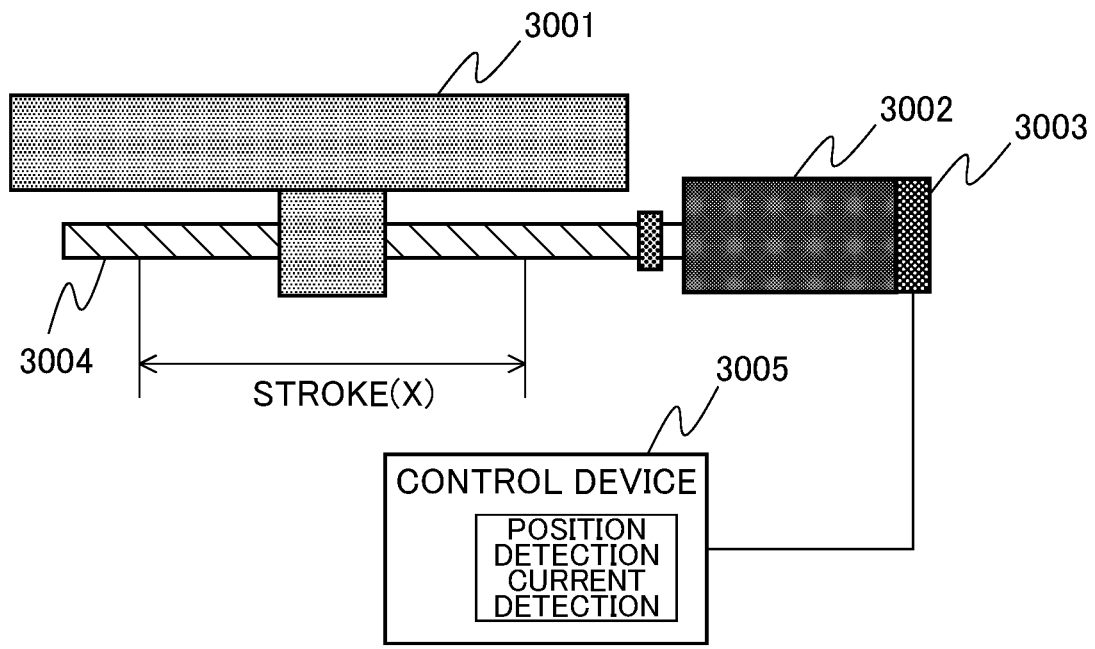
FIG. 6A is an explanatory diagram showing an outline of a machine tool including a mechanism that converts rotational motion into linear motion.
Figure 6B:
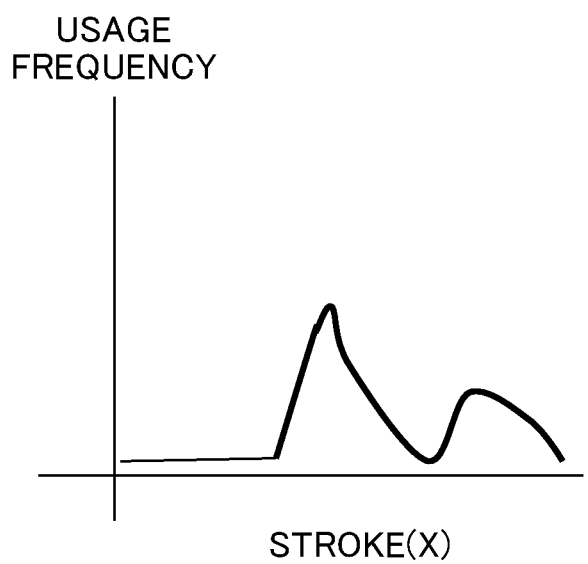
FIG. 6B is a characteristic diagram showing the relationship between use frequency and stroke.
Figure 6C:
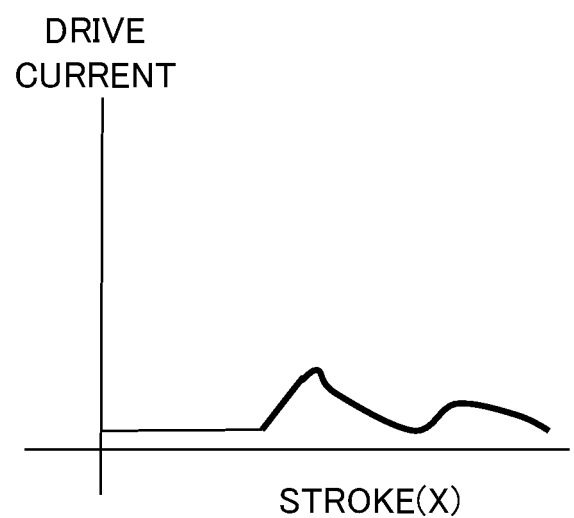
FIG. 6C is a characteristic diagram showing the relationship between drive current and stroke.

The present invention has been made based on such a demand, and hereinafter, the present invention will be explained in detail based on embodiments. Hereinafter, an embodiment of the present invention will be explained in detail using the drawings. The embodiment explained hereinafter explains an example using a machine such as a machine tool including an injection molding machine, cutting machine, electric discharge machine and robot, as the machine. FIG. 2A is a block diagram showing the configuration of the embodiment of a diagnostic service system according to the present invention. FIGS. 3 and 4 are block diagrams showing the configurations of a machine and factory monitoring system. FIG. 5 is a flowchart showing operations of the factory monitoring system. FIG. 6A is an explanatory diagram showing an outline of a machine tool including a mechanism that converts rotational motion into linear motion. FIG. 6B is a characteristic diagram showing the distribution of disturbance load torque. FIG. 6C is an explanatory diagram for explaining uneven wear detection of a ball screw. It should be noted that n used in the following explanation indicates a positive integer of at least 1, unless specifically stated as being plural. Although the number of machines, number of factory monitoring systems, number of service centers, and number of service terminals are all indicated by n, unless specifically stated as being the same number in the following explanation, it is possible to arbitrarily set each of the number of machines, number of factory monitoring systems, number of service centers, and number of service terminals.

<Overall Configuration of Diagnostic Service System 1>

The overall configuration of a diagnostic service system 1 will be explained using FIG. 2A. As shown in FIG. 2A, a service center management device 401 is connected with at least one factory monitoring system 100 via a security shared network 300, and is connected to at least one service center 600 via a network. Each of the at least one factory monitoring system 100 is connected to at least one machine via a network. FIG. 2A shows that the factory monitoring system 100 consists of a plurality of factory monitoring systems 100-1, 100-2, . . . , 100-n, and the factory monitoring system 100-1 is connected to several machines 200-1, 200-2, . . . , 200-n.

At least one service terminal 700 is connected to each of the at least one service center 600 by a network via a service control 601. In FIG. 2A, the service center 600 consists of a plurality of service centers 600-1, 600-2, . . . , 600-n, and each service center 600 is connected to a plurality of service terminals 700-1, 700-2, . . . , 700-n by a network via the service control 601. The service control 601 may be realized as a function within the service center 600.

In the case of a failure occurring in a machine installed in the factory, it is possible to request fault diagnosis and a solution thereof to the service center 600 via the service center management device 401 by the user inputting an interview sheet via the factory monitoring system 100. In addition, the user can request fault diagnosis and a solution thereof to the service center 600 by sending an inquiry mail 104 via a personal computer, smartphone, portable telephone, etc. to the service center management device 401, or calling using an inquiry IP phone 105. More specifically, instead of the user inputting an interview sheet, by an operator at the service center 600 inputting an interview sheet based on report contents acquired via an inquiry mail 104 or inquiry IP phone 105, it is possible to request fault diagnosis and a solution thereof to the service center 600.

The service center management device 401 is connected with a customer service server 402, manual server 403, social network system (SNS) 404, sales data server 405, factory data server 406, field serviceman position information system 407, and knowledge system 408. The knowledge system 408 is connected to a failure know-how database 409. Each of the service centers 600 is connected with a component shipping center 500, and a personnel dispatch center 501. FIG. 2A shows a case of the service center 600-1 being connected to the component shipping center 500 and personnel dispatch center 501.

In this way, the service center management device 401 can quickly perform personnel dispatch scheduling for component replacement or repair and adjustment, after managing component status and personnel data, and fault diagnosis has completed, via the service center 600.

Each service center 600 can be established as a service center arranged globally (worldwide). For example, the service center 600-1 is arranged in Tokyo, the service center 600-2 is arranged in New York, and the service center 600-3 is arranged in Beijing. By doing this, it may be configured so as to prioritize the service center arranged in the region corresponding to the location of the factory. It may be configured so that an inquiry of a fault (interview sheet) transmitted to the service center management device 401 is transmitted by the service control 601 to the service terminal 700 of a responder having the least inquiry work on hand. In addition, it may be configured so that the responder designated by the user is selected by the user designating a responder ID. FIG. 2A shows the matter of the service center 600 being connected to the service control 601, and the service control 601 being connected to the plurality of service terminals 700-1, 700-2, . . . , 700-n. An inquiry of a fault transmitted to the service center management device 401 is transmitted to the service terminal (for example, service terminal 700-1) of a responder having the least inquiry work on hand.

<Configurations and Operations of Machine and Factory Monitoring System>

It is configured so that each user and service worker interchange a maintenance contract related to maintenance of each machine in a factory, and there is an unscheduled contract and a scheduled contact in this maintenance contract, for example. Unscheduled contract is a fault repair contract for performing repair in the case of a fault occurring. Scheduled contract is a preventative maintenance contract for performing preventative maintenance by predicting an abnormal occurrence by performing fault diagnosis periodically other than during fault repair, and replacing components for which an abnormal occurrence is predicted, lifespan components and consumable components. The maintenance contract between each user and service worker can be performed at each factory site, and a factory monitoring system for monitoring each machine of the factory is provided at each factory. The factory may be located globally (worldwide). For this reason, the factory monitoring system is configured so as to acquire information from any machine, and convert the acquired information into a shared format established in advance ("referred to as "global format").

In addition, premised on a case such as performing fault diagnosis in the diagnostic service system 1, each factory monitoring system 100 is required to store data of the machine 200. The machine tool is often used for a long time (for example, on the order of 35 years) in the factory of the user. Since it is premised on the machine tool using the product of any maker, it is important to be able to quickly acquire a manual related to this machine, maintenance history, and operation information, etc. of operating at the factory of the user, from the moment of delivering this machine from the maker's factory, based on the machine number. As ways of using the machine tool, there is a case of making continuous production (for example, continuously producing the same product for 24 hours), and the case of performing intermitted production. In particular, in the case of an alarm occurring when performing intermitted production, it is desirable to accurately know the history such as when previously operated.

The machine tool does not always apply the same parameters, and often corrects the previously applied parameters to apply. For this reason, it is demanded that the factory monitoring system 100 collects and manages information (data) related to each machine tool, and establishes a state that can directly reference this information upon alarm occurrence, etc. Herein, as information related to machine tools, the following information can be exemplified in addition to the machine information in FIG. 3 described later.

(a) Operating State of Machine

Information of the operating state of the machine is a machining program, motor command speed, motor current and information of various sensors during machining, for example. In particular, information in the case of an injection molding machine, for example, is a shot number since operation start, maximum current value of the motor driving the injection screw during injection, maximum current value of the motor driving a clamping mechanism during mold clamping, maximum current value of the motor driving the ejector shaft, maximum current value during measurement of the motor rotationally driving the screw, peak injection pressure, current cycle time of 1 molding cycle, measured time, injection time, and alarm codes, etc.

(b) Operating State Transition

Information of an operating state transition is a temporal change in the above-mentioned operating state, for example.

(c) Fault History

Information of fault history is the respective data of previously occurring alarm contents, occurrence time, repair completion time, fault repair contents, etc., for example.

(d) Maintenance History

Information of maintenance history is the periodic inspection contents and implementation period, replaced consumable components and lifespan components, replacement period, etc., for example.

(e) Production Management Information

The information of the production management information is total operating time, and total stroke number (slide machining number).

<Factory Monitoring System 100>

Hereinafter, a control device constituting the factory monitoring system 100 of the diagnostic service system 1 of the present invention will be explained. Hereinafter, unless otherwise mentioned, the control device constituting the factory monitoring system will be referred to simply as "factory monitoring system". FIG. 3 is a block diagram for realizing operation of the factory monitoring system 100 by software, and FIG. 4 shows functions thereof by blocks. Each part shown in FIG. 4 may be constituted by software or may be configured by hardware. In FIG. 3, the factory monitoring system 100 includes a CPU 1001, a storage unit 1003 that stores software executed by the CPU 1001, and an internal converter 1004 connected with the machine 200. It should be noted that the factory monitoring system 100 may connected with the machine 200 via an external converter 800 instead of the internal converter 1004. As shown in FIG. 4, the factory monitoring system 100 includes a storage unit 1002, internal converter 1004, data acquisition unit 1011, stored data management unit 1012, control unit 1013, communication unit 1014 for communicating via the security shared network 300 with the service center management device 401, and format conversion unit 1015. As mentioned above, the factory monitoring system 100 may connect with the machine 200 via the external converter 800 in place of the internal converter 1004. The control unit 1013 controls the internal converter 1004, external converter 800, data acquisition unit 1011, stored data management unit 1012, communication unit 1014, and format conversion unit 1015.

At least one factory terminal (not illustrated) for displaying information sent from the service center management device 401 via the security shared network 300 is connected to the factory monitoring system 100. The information displayed is the screen information of FIGS. 7 to 13 described later, for example. The factory terminal includes a control unit (not illustrated) and a display device (not illustrated) such as a liquid crystal display including a display panel. A key operation screen is displayed on the display whereby character input is possible; however, an input unit such as a separate keyboard may be provided. The control unit displays information such as the screen information of FIGS. 7 to 13 sent from the service center management device 401 on the display. Data inputted by a touch panel (or input unit such as a keyboard) is sent to the service center management device 401. In addition, the factory monitoring system 100 receives display screen information in which the required data is displayed from the service center management device 401. It should be noted that, by the service center management device 401 including a Web server, and the factory terminal including a Web browser, it may be configured so as to display and control the screens of FIGS. 17 to 23.

In FIGS. 3 and 4, although one factory monitoring system 100-1 is shown, each of the factory monitoring systems 100-2, . . . , 100-n include the same configuration. As shown in FIG. 2A, each of the factory monitoring systems 100 is provided to a respective factory, is connected to machines via a network, and monitors the machines within the factory. Although FIGS. 3 and 4 show only machines 200-1 and 200-2, the factory monitoring system 100-1 monitors at least one of the machines 200. The plurality of machines 200-1, 200-2, . . . , 200-n are not limited to products of a specific maker, and can include machines of any plurality of makers. Sensors that detect position, acceleration, electrical current value, temperature, humidity, etc. are mounted to each of the plurality of machines 200-1, 200-2, . . . , 200-n. FIG. 3 shows a case in which at least one sensor 2001-1, 2001-2, . . . , 2000-n is mounted to the machine 200-1. The control device of the machine 200-1 reads information from the sensors 2000-1, 2000-2, . . . , 2000-n, and sends this information to the factory monitoring system 100-1. The factory monitoring system 100 acquires information measured by sensors, and data of parameters indicating the operating state of the machine, via an interface (communication protocol (data organization) described later) set for every machine 200 at every predetermined period (for example, period of no more than 100 milliseconds).

FIG. 6A shows an example of sensor data. In the control system such as that shown in FIG. 6A, the sensor data may be disturbance load torque, etc. calculated by the control device of the machine 200. For example, in the case of a machine having a mechanism converting the rotational motion of the motor 3002 into linear motion by the ball screw 3004 to cause the table 3001 of work to move linearly, as shown in FIG. 6A, the movement distribution within an operating limit of this table 3001 can be represented by a position signal of a pulse coder 3003 for the motor 3002, and the distribution (FIG. 6B) of the disturbance load torque calculated in the control device of the machine 200.

This distribution is sent to the factory monitoring system 100-1 from each of the machines 200-1, 200-2, . . . , 200-n within the factory, and totaled by the factory monitoring system 100-1. According to the totaling results thereof, by the ability to detect at which position of the ball screw the use is great, or at which position the load torque is great (FIG. 6C) when moving at a fixed speed, it is possible to detect uneven wear of the ball screw (uneven wear detection of ball screw). The detection of uneven wear of the ball screw is performed by the factory monitoring systems 100-2, . . . , 100-n, similarly to the factory monitoring system 100-1.

Figure 6D:
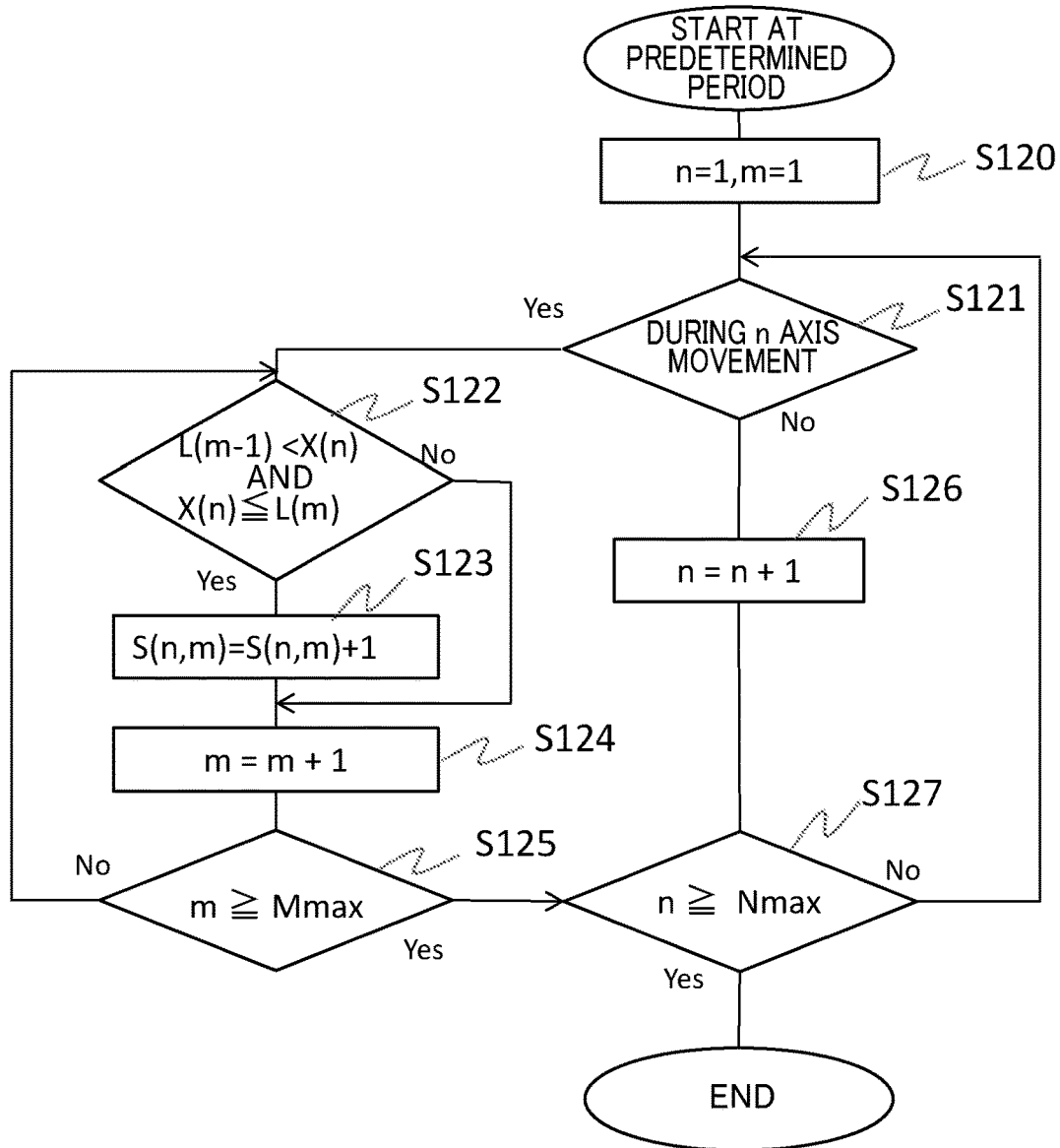
FIG. 6D is a flowchart showing control for obtaining a distribution of disturbance load torque of a machine 200.
Figure 6E:
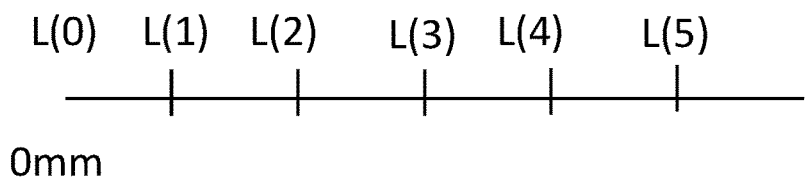
FIG. 6E is a diagram showing divided stroke.

FIG. 6D is a flowchart showing the control for obtaining a distribution of disturbance load torque of the machine 200. FIG. 6A shows a single axis machine 200, but FIG. 6D shows a flowchart of control for the case of a multi-axis machine 200. FIG. 6E shows the divided stroke, and the divided stroke is normally the distance between ball screw pitches (for example, at least several millimeters). As shown in FIG. 6D, the factory monitoring system 100 starts analysis of data from each machine at a predetermined period. In Step S120, the factory monitoring system 100 sets the axis number n of the machine to 1, and the division number m of the stroke of the ball screw to 1 (n=1, m=1). Next, in Step S121, the factory monitoring system 100 determines whether the n axis is during movement. It becomes n=1 at the start time. In the case of the n axis being during movement (YES in Step S121), in Step S122, the factory monitoring system 100 determines whether the current position X(n) of the n axis is larger than the position L(m−1) of the divided stroke, and no more than the position L(m) of the divided stroke. If the current position X(n) of the n axis is greater than the position L(m−1) of the divided stroke, and no more than the position L(m) of the divided stroke, in Step S123, the factory monitoring system 100 will add 1 to the cumulative number S(n,m) at the position of the $m^{th}$ stroke division of the n axis sampled at the predetermined period, and further adds 1 to the division number m of the stroke of the ball screw in Step S124. It should be noted that the cumulative number S(n,m) is completely reset to 0 during factory delivery, and during ball screw replacement. Counting of the cumulative number S(n,m) is only performed during movement, and is not counted while stopped. Then, in Step S125, the factory monitoring system 100 determines whether the division number m of the stroke of the ball screw to which 1 was added is at least a maximum value Mmax for the division number of the stroke of the ball screw. If the division number m of the stroke of the ball screw to which 1 was added is at least the maximum value Mmax for the division number of the stroke of the ball screw (YES in Step S125), the processing advances to Step S127. If the division number m of the stroke of the ball screw is not at least the maximum value Mmax for the division number of the stroke of the ball screw (NO in Step S125), the processing advances to Step S122. From Step S122 to Step S125 is repeated until the division number m of the stroke of the ball screw becomes at least the maximum value Mmax for the division number of the stroke of the ball screw. In Step S121, in the case of the factory monitoring system 100 determining the n axis as not being during movement (NO in Step S121), the factory monitoring system 100 adds 1 to the axis number n of the machine in Step S126, and determines whether the axis number n of the machine is at least the maximum axis number Nmax of the machine in Step S127. If the axis number n of the machine is not at least the maximum axis number Nmax of the machine, the processing returns to Step S121. Steps S121, S126 and S127 are repeated until the axis number n of the machine becomes at least the maximum axis number Nmax of the machine. If the axis number n of the machine is at least the maximum axis number Nmax of the machine, the processing is ended. The position L(m) of the divided stroke (for example, L(0), . . . , L(5), etc. in FIG. 6E), maximum value Nmax, and maximum value Mmax are set in accordance with the machine use during factory delivery.

The machine information of each of the at least one machines 200-1, 200-2, . . . , 200-n is registered in the factory monitoring system 100-1 for every machine in advance when connecting the machines 200-1, 200-2, . . . , 200-n to the factory monitoring system 100-1. More specifically, the factory monitoring system 100-1 registers the meta-data related to the machines for every machine number identifying the respective machines. As shown in the machine information of FIG. 3, for example, the meta-data is the maker name of the machine, model name of the machine, serial number of the machine, use control device name, control device maker serial number, communication interface, communication protocol (data organization), etc. The maker name, model name, serial number, etc. of the machine are data for specifying the machine. The machine number may be set as a number that is unique within each factory. In addition, the machine number may be set as the maker name, model name, or serial number of the machine. Herein, communication protocol (data organization) is a command system for the factory monitoring system 100 to acquire information measured by the sensors installed in the machine, data of parameters indicating the operating state of the machine, alarm data, etc.

The factory monitoring system 100 includes a data acquisition unit 1011 shown in FIG. 4, and the control unit 1013 designates the machine number, and acquires the operating state, etc. of the machine every predetermined period (for example, period no more than 100 milliseconds, or the like), via the data acquisition unit 1011. It should be noted that the data acquisition unit 1011 acquires the operating state, etc. of this machine based on the communication protocol (data organization) of this machine corresponding to the machine number. The information of the operating state, etc. of the machine thus acquired is stored in the storage unit 1002 together with the acquisition time (time stamp). In the above way, each of the factory monitoring systems 100 acquires data serving as the basis of the diagnostic service system 1.

Each of the plurality of machines 200-1, 200-2, . . . , 200-n can employ a machine having different hardware or protocol such as Ethernet (registered trademark), Ether Cat (registered trademark), RS485 and RS232C. As shown in FIG. 4, the electrical differences are converted using the internal converter 1004 of the factory monitoring system 100-1, and the inside of the factory monitoring system 100-1 is entirely compatible with the Ethernet communication standard. It should be noted that conversion from RS485, RS232C, etc. to Ethernet may be configured so as to connect the external converter 800 of a commercially available converter, etc. to the machine, instead of the internal converter 1004. This similarly applies also for the other factory monitoring systems 100-2, . . . , 100-n.

The factory monitoring system has a function of standardizing the data array and/or units (global format), and stores the operating data, history data, manipulation history data, etc. inputted from various machines 200-1, 200-2, . . . , 200-n to the storage unit 1002 in the global format. By doing this, the operating data, history data, manipulation history data, etc. can be determined as data of the same type, when viewed from host service centers 600-1, 600-2, . . . , 600-n. In electrical or software conversion, machine information such as the maker name and model name in FIG. 3 is used, and this machine information is registered in advance when connecting the machine to the factory monitoring system.

More specifically, as shown in FIG. 3, the storage unit 1002 in the factory monitoring system 100 stores in advance protocols P1, P2, . . . , Pn, etc. of software communicating with every machine number. Meta-data such as a data array, units, etc. related to the temperature, speed, operating data, etc. is included in this protocol. The control unit 1001 such as a CPU uses software stored in the storage unit 1003 to reference the protocol stored in the storage unit 1002, retrieves data from the machines 200-1, 200-2, . . . , 200-n, and switches to a data organization (global format) used by the overall system. In addition, the control unit 1001 has a function of attaching the time when communicating data, and sending to the storage unit 1002. The storage unit 1002 is installed on a circuit capable of being read from another CPU. The protocols P1, P2, . . . , Pn, machine information I1, I2, . . . , In stored in the storage unit 1002 correspond to the machines 200-1, 200-2, . . . , 200-n.

Operations of the factory monitoring system 100 will be explained using the block diagram showing the configurations of the machine and factory monitoring system 100 in FIG. 4, and the flowchart in FIG. 5.

As shown in FIG. 5, the data acquisition unit 1011 of the factory monitoring system 100 sends instructions (commands) to each machine 200 in order to acquire data from the respective machines 200 periodically in Step S110. Each machine 200 sends data following the instruction (command). As already mentioned, the factory monitoring system 100 is connectable with machines of different communication protocols (physical layer) such as Ethernet (registered trademark), Ether Cat (registered trademark), RS485 and RS232C. The electrical difference is converted using the internal converter 1004 of the factory monitoring system 100 as shown in FIG. 4, and inside of the factory monitoring system 100 is entirely compatible with the electrical standard of Ethernet. In addition, conversion from RS485, RS232C, etc. to Ethernet can also employ an external converter 800 such as a commercially available converter.

In Step S111, the electrical standard is converted using the internal converter 1004 or external converter 800, and the data acquisition unit 1011 acquires data from each machine 200. The acquisition of data is performed every predetermined period (for example, period of no more than 100 milliseconds, etc.).

In the case of there being data processing such as that explained using FIGS. 6B and 6C (YES in Step S112), data processing is performed in Step S113, and is converted to a shared format (global format) by the format converter 1015 in Step S114.

In the case of there not being data processing (NO in Step S112), the processing advances to Step S114. Subsequently, the data converted to the shared format is stored in the storage unit 1002 by the stored data management unit 1012 (Step S115). The stored data management unit 1012, when storing data, stores together with time information of when acquiring the data (time stamp). The time information may be time information when stored.

<Configuration and Operation of Service Center Management Device 401>

Figure 2B:
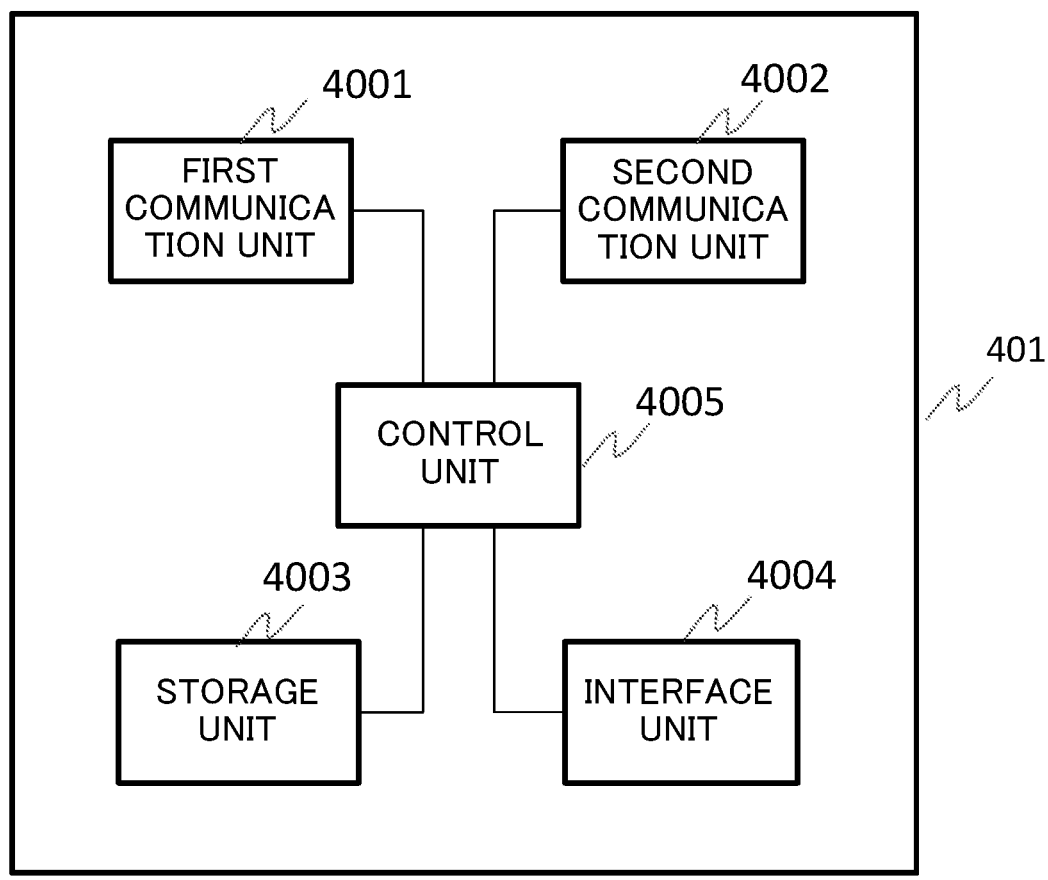
FIG. 2B is a block diagram showing the configuration of a service center management device 401.

The service center management device 401 is a management device for a case of at least one service center 600-1, 600-2, . . . , 600-n being arranged globally. In the case of there being one connected service center, this service center may also serve as a service center management device, and execute the same functions. FIG. 2B is a block diagram showing the configuration of the service center management device 401.

The service center management device 401 includes a first communication unit 4001 that communicates with the factory monitoring system 100 via the security shared network 300; a second communication unit 4002 that communicates with the service center 600 via a network; a storage unit 4003 that stores data for constituting a charged membership system; an interface unit 4004 connected with a customer service server 402, a manual server 403, SNS 404; a sales data server 405, a factory data server 406, and knowledge system 408; and a control unit 4005 controlling each unit. The control unit 4005 accesses the customer service server 402, manual server 403, SNS 404, sales data server 405, factory data server 406 or knowledge system 408, based on a request from the factory monitoring system 100 or service terminal 700, and obtains the requested data and sends to the factory monitoring system 100 and service center 600.

In the case of con wring the functions of the control unit 4005 of the service center management device 401 by software, these functions can be realized by causing programs encoding the operations of the control unit 4005 of the service center management device 401 to run by a computer. The computer is configured by a storage unit such as a hard disk or ROM storing the programs encoding the operations of the control unit 4005, DRAM storing data required in computation, a CPU, and a bus connecting each part. Then, in this computer, the functions of the control unit 4005 can be realized by storing the information required in computation in the DRAM, and causing these programs to run in the CPU.

The service center management device 401 is connected with a sales data server 405 that stores sales data when receiving an order for the machine 200 from the customer (factory) of the present diagnostic service system, and a factory data server 406 that stores factory data such as inspection data and delivery date, and components being used, when producing each machine 200. In addition, the service center management device 401 is connected with a field serviceman position information system 407, and is able to track the position of a field serviceman worldwide from GPS data such as of the portable telephone possessed by the field serviceman.

Furthermore, the service center management device 401 is connected with the knowledge system 408. The knowledge system 408 automatically analyzes the machine status according to free text inputted by the user, accesses the database 409 recording failure know-how according to the contents thereof, and sends the contents made by automatically creating analysis information corresponding to the machine status to the service center management device 401.

In addition, the service center management device 401 monitors the communication load status, etc. of each service center 600, and automatically distributes to a service center of low load. Alternatively, the service center management device 401 may be configured so as to output a response request to all of the service centers 600-1, 600-2, . . . , 600-n, determine the service center with the fastest response as the service center with low communication load, and perform fault diagnosis having an inquiry from a unique customer by this service center. Furthermore, by the user designating the responder when inquiring to the service center management device 401 by the factory monitoring system, inquiry mail or inquiry IP phone, it is possible to for the user to make a connection request to a familiar responder. The diagnostic service system 1 can establish the fee-based service of a membership service. A membership service providing the diagnostic service system 1 for a fee to a member can be constructed by providing the storage unit 4003 to the service center management device 401, and recording the access frequency, access time, etc. of users. For example, in the case of a user inquiring to the service center management device 401 by the factory monitoring system 100, inquiry mail 104 or inquiry IP phone 105, the control unit 4005 records the access frequency, access time, or the like of the user in the storage unit 4003. More specifically, the control unit 4005 stores, in the storage unit 4003 to be associated with the user ID of the inquiry source, the frequency or connection time inquiring to the service center management device 401 from the factory monitoring system 100, frequency of inquiring to the service center management device 401 by inquiry mail 104, and call time, etc. in the case of inquiring to the service center management device 401 by the inquiry IP phone 105. By billing the fee corresponding to this frequency or time, a pay-for-use system is constructed. It is also possible to provide the diagnostic service system 1 as a fixed charge.

Additionally, the service center management device 401 is connected with the social network system (SNS) 404, manual server 403 as a system managing manuals of different manufacturers, and the customer service server 402 which records information related to customer service. It should be noted that the customer service server 402 stores information important for security management, for example, member information such as member ID, machine information, maintenance history, warranty history, etc.

<Diagnostic Service System Menu>

The service center management device 401 includes a function of providing the diagnostic service system menu shown in FIG. 7 to the user by way of the factory monitoring system 100. To receive the diagnostic service system shown in FIG. 7, first, the user inputs a user ID and password on the authentication screen shown in FIG. 8. Herein, the user ID is linked to the factory to which the user belongs, and the service center management device 401 can specify the factory from the user ID. When the user inputs the user ID and password, the company name (factory name) and address thereof are displayed on the authentication screen. If the user inputs OK on the authentication screen, a screen of the diagnostic service system menu shown in FIG. 7 is displayed. On the screen displaying the diagnostic service system menu shown in FIG. 7, when the user inputs the number of a system used, any of the screens (submenus) shown in FIG. 9 designated by the number of the system is displayed. When the required information is inputted and execution is selected by the user on any of the screens shown in FIG. 9 (submenus), the selected service is provided, and the program processing for executing the provided function by the respective services is executed.

The diagnostic service system can be used by a user, or an operator (responder) of the service center 600. In the case of being used by the user, for example, knowledge diagnosis is performed using "3. Knowledge Diagnostic System" by the user him/herself. Furthermore, the user uses "4. Maintenance History Search", "5. Periodic Maintenance History", etc. to acquire the operating status of this machine immediately before a failure report time (alarm occurrence time) of this machine, operating status of this machine (way of use), maintenance history thus far of this machine, etc. based on the machine number, and uses their own knowledge to perform fault diagnosis. Next, the main submenus provided by the diagnostic service system menu will be explained. In the following explanation, a case of the user using submenus will be explained.

<Manual Search System>

In the case of the user selecting the submenu "1. Manual Search System", the user inputs the machine number and keyword desired to be searched, on the screen of the manual search system of FIG. 9. Based on the input information, the service center management device 401 searches the contents hitting the keyword from the maker manual of a specified machine recorded in the manual server 403, based on machine information such as the maker name and model name, stored in advance as shown in FIG. 3, and displays as a list. The user can select the required item from the list display to achieve the objective.

Figure 10:
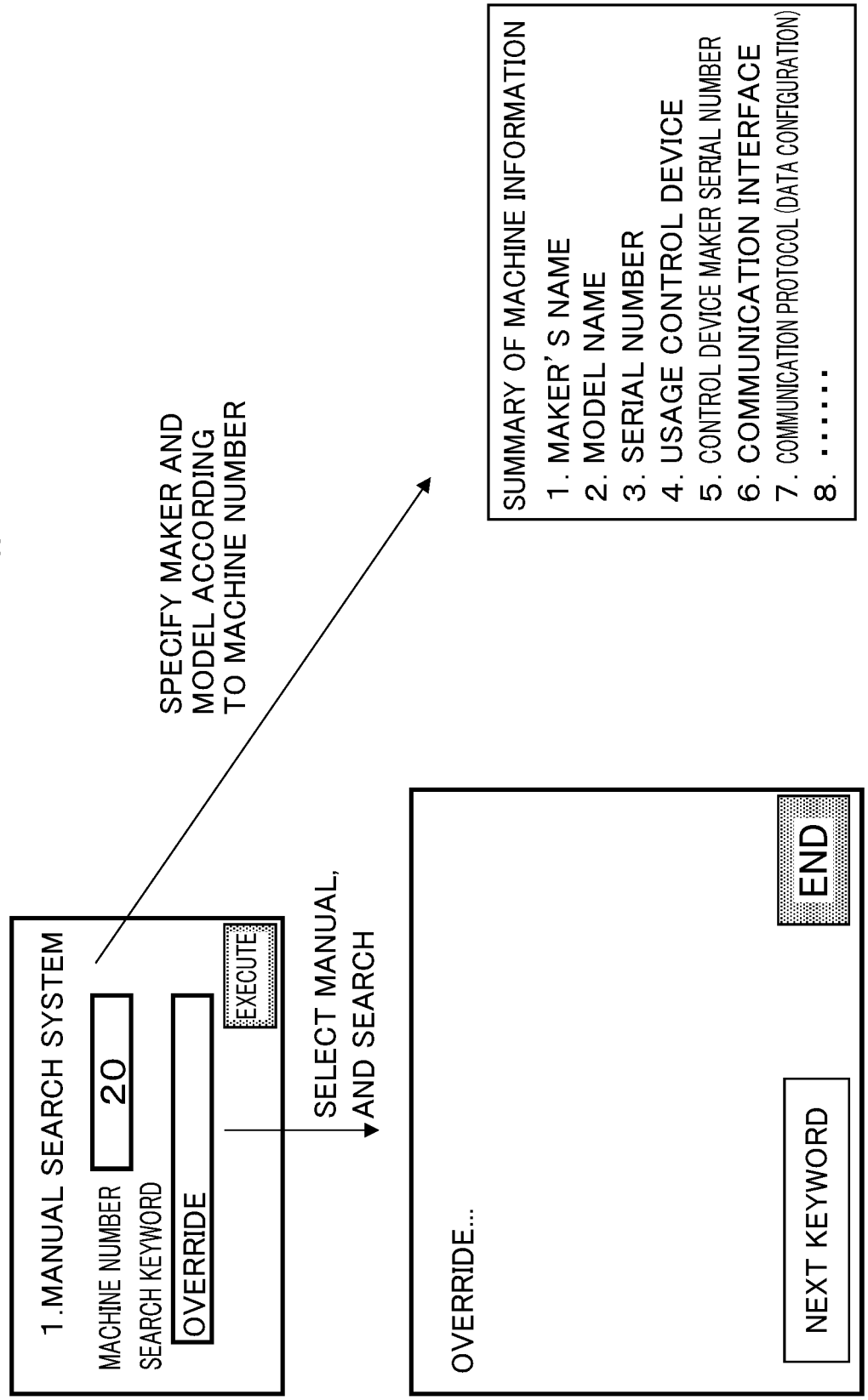
FIG. 10 is a view showing a screen of a manual search system and an input example.

More specifically, when the user inputs "20" as the machine number on the screen of the manual search system displayed as shown in FIG. 10, and inputs "override" as the keyword desired to be searched, the service center management device 401 specifies the machine maker and model name based on the machine number "20", and selects the manual having this model from the manual server 403 as the manual. Next, the service center management device 401 searches the selected manual based on the keyword of "override", and displays pages hit from the header. When the user selects "next keyword", the service center management device 401 displays the next page hit. The pages are scrolled by "↑" and "↓", and in the case of information that the user wants to know being obtained from the manual, the user returns to the diagnostic service system menu of FIG. 7 by selecting the end key.

<Fault Diagnostic System>

Figure 11:
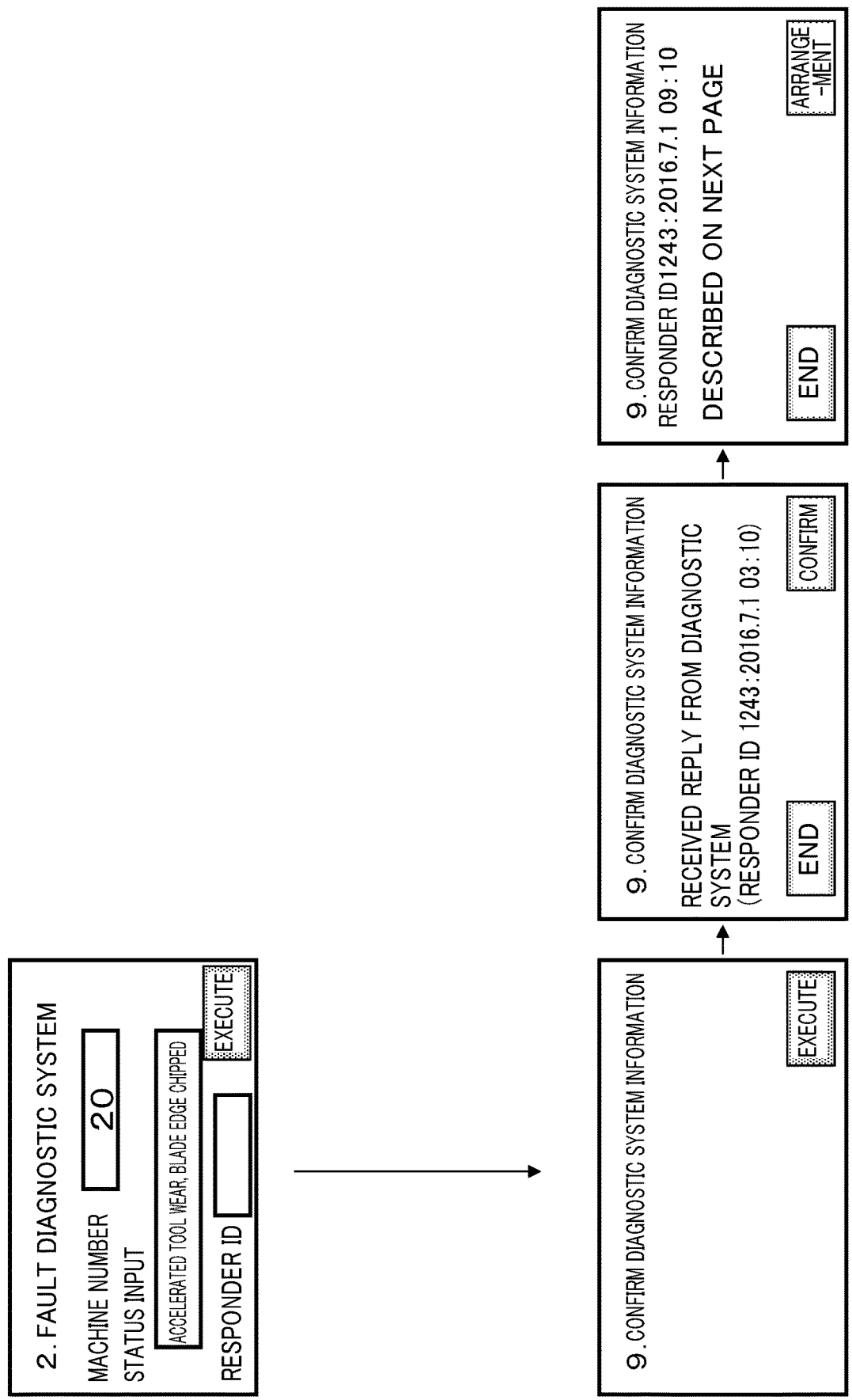
FIG. 11 is a view showing a screen of a fault diagnostic system and input example, and a diagnostic system information confirmation screen.

The submenu "2. Fault Diagnostic System" is selected when the user demands a response from a responder (operator of service center), in the case of an alarm of the machine 200 occurring, for example. In the submenu "2. Fault Diagnostic System", the user performs input of the machine number and status on a predetermined interview sheet such as that shown in FIG. 9. For example, when the user inputs "20" as the machine number, and inputs "accelerated tool wear, blade edge chipped" as the status input as shown in FIG. 11, on the screen of the fault diagnostic system of FIG. 9 (screen of predetermined interview sheet), a responder who can respond the fastest is selected by the service control 601 via the service center management device 401 and service center 600. More specifically, the service center management device 401 selects a responder (candidate) who can respond the fastest, by referencing a table for managing the working situation of operators of the service center 600. It should be noted that the user can designate the responder ID on the input screen. In this case, the responder designated by the user is selected. In the case of the user designating the responder ID, the service center management device 401 transmits the machine number and status input to a corresponding service terminal. In the case of the designated responder not being present, the service center management device 401 notifies the reason to the user, as well as transmitting the machine number and status input to another responder who can respond the fastest. In addition, the service center management device 401, in the case of requiring time for response of the designated responder, notifies the user of this fact.

Figure 9:
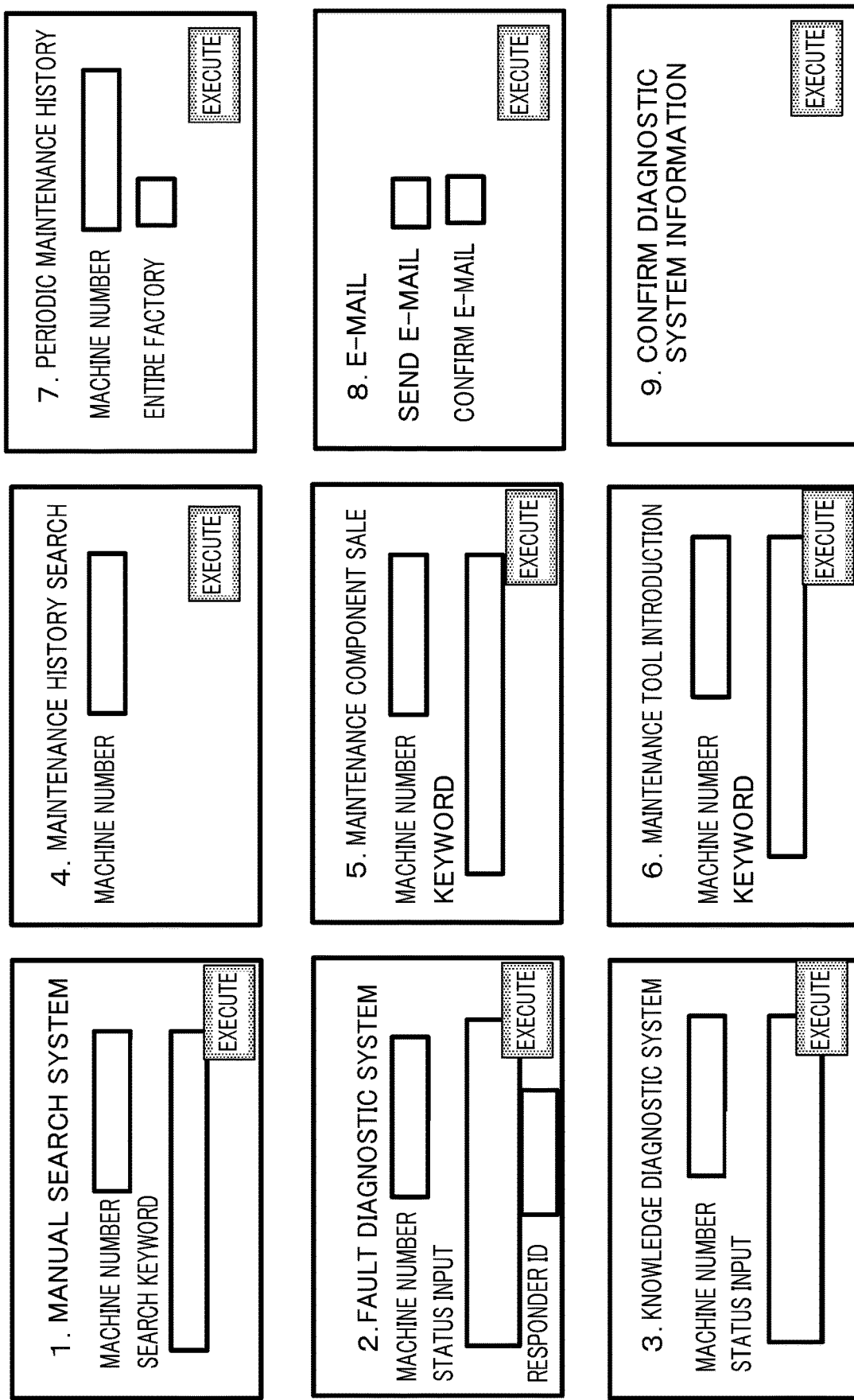
FIG. 9 is a view showing a selection screen of a diagnostic service system menu.

In the case of the user using the fault diagnostic system of FIG. 9, the user can send the data required in fault diagnosis, which is the operating data of the machine that is the target at this time, to the service center management device 401. Whether or not to select this sending as automatic or manual is selectable upon membership contracting. In the case of not selecting automatic sending, it is possible for the user to manually send following the instructions of the responder.

As the fault reporting route from the user, there are other routes via mail or inquiry IP phone. In the case of mail reception, a contact (operator) creates an interview sheet based on the contents of the received mail. In addition, in the case of IP phone reception, the contact (operator) creates the interview sheet while listening to the speech of the user via the IP phone.

By performing a query based on the sent machine number, the responder can understand the operating situation at the factory of the machine corresponding to the machine number, and the situation when sold. In addition, the responder starts analysis of the fault contents from the sent message. The responder performs manipulation of the service terminal 700 to perform fault diagnosis. The manipulations of the service terminal 700 for performing fault diagnosis will be described later. In the case of the responder, as a result of fault diagnosis, determining that replacement of components and dispatch of a field engineer for replacing components are necessary, can enquire to the service center 600 from the service terminal 700, and notify to the questioner (user) a response such as the component delivery data, arrangement of field serviceman, and arrival time.

The questioner (user) can confirm the response from the responder by selecting "9. Diagnostic System information Confirmation" on the diagnostic service system menu of FIG. 9. More specifically, the questioner (user) selects the execute key on the screen of "9. Diagnostic System Information Confirmation" shown in FIG. 11 to confirm the response from the responder. In the case of confirming the response message from the responder, the questioner (user) selects the confirmation key. The response message from the responder includes information such as diagnosis information, components, and field serviceman dispatch, as shown in FIG. 12. In the case of the questioner (user) accepting dispatch of a field serviceman, the field serviceman is arranged by the questioner (user) selecting an arrangement key. In the case of the user selecting the arrangement key, and approving the proposal of the responder, the components and field serviceman are immediately dispatched. When the field serviceman arrives on site, work is started. The exchanges between the operator and user in this business practice are registered in the customer service server 402 in chronological order. It should be noted that the field serviceman can also diagnose the status of other machines of the user visited. A recording of this time is also recorded in the customer service server 402. By the user using the present fault diagnostic system in the above way, it is possible to use high accuracy fault diagnosis in the shortest time, and promptly repair a failed part.

<Knowledge Diagnostic System>

The submenu "3. Knowledge Diagnostic System" provides a function of a knowledge diagnostic system to the user. By doing this, the user can diagnosis the cause, etc. of the alarm occurrence him/herself, without demanding a response from a responder (operator of service center). When the user inputs the machine number and status via the screen of "3. Knowledge Diagnostic System" shown in FIG. 9, the knowledge system 408 automatically analyzes the status according to free text, accesses the database 409 recording failure know-how according to the contents thereof, and replies the auto-answer contents via the service center management device 401. As a result of response, in the case of the cause of failure being the machining conditions, wear of the machining tool, etc., components ordering of the machine tool and dispatch of a field serviceman are unnecessary. In the case of the cause of failure being other than the machining conditions, wear of the machining tool, etc., the user selects the screen of "2. Fault Diagnostic System" in FIG. 9, and in the case of component ordering and dispatch of a field serviceman being necessary as a result of fault diagnosis, performs reservation of the aforementioned components and field serviceman. In addition, by saving the response of the knowledge system, it is possible to create a user unique fault diagnosis guidance. The submenu "3. Knowledge Diagnostic System" is basically a diagnostic survey by self-service of the user, and is not requesting fault diagnosis to the service center 600. The knowledge diagnostic system can respond with a priority order to the diagnosis results.

<Maintenance History Search>

By the user selecting the submenu "4. Maintenance History Search", and inputting the machine number to the screen of "Maintenance History Search" shown in FIG. 9, the service center management device 401 references the maintenance history in the customer service server 402. According to this function, the user is able to automatically manage the specific machine fault log in a factory, component delivery log, and field serviceman dispatch log without managing in-house. In addition, by accumulating and referencing machine fault logs, it becomes possible to construct a unique knowledge system.

<Maintenance Component Sales>

By the user selecting the submenu "5. Maintenance Component Sales", and inputting the machine number on the screen of "Maintenance Component Sales" shown in FIG. 9, the user can buy maintenance components required by the machine from the component shipping center 500 via the service center 600. The user can easily buy maintenance components required by the machine without mistakes, even in a case of owning equipment of different manufacturers.

<Maintenance Tool Introduction>

By the user selecting the submenu "6. Maintenance Tool Introduction", and inputted the machine number on the screen of "Maintenance Tool Introduction" shown in FIG. 9, the user can buy maintenance tools required by the machine. In addition, by using a social network, the user can reference tools effective in maintenance.

<Periodic Maintenance History>

By the user selecting the submenu "7. Periodic Maintenance History", and inputting the machine number on the screen of "Periodic Maintenance History" shown in FIG. 9, the user can reference the performed time of periodic maintenance conducted in the past of each machine maker, and the maintenance contents thereof recorded in the factory data server 406. Since the periodic maintenance history is managed all together in this way, even in a case of machines of different manufacturers and different approaches to maintenance coexisting, the user can comfortably use without being aware of the differences in manufacturers.

<Other>

By the user selecting the submenu "8. E-mail (SNS)", and selecting any of E-mail sending or E-mail confirmation via the screen of "E-mail" shown in FIG. 9, the user is able to directly send mail to the service center management device 401 from their own personal computer (PC), smartphone, or present system, and conversely receive mail from the service center management device 401. The user is thereby able to manage mail sent to the service center management from their own PC, smartphone or present system. The diagnostic service system provides a function of social network (SNS) in addition to mail. By doing this, the exchange of business information and technical information between members managed by security is possible.

<Diagnostic Service System Information>

When the user selects the submenu "9. Diagnostic System Information", and selects execution on the screen of "Diagnostic System Information Confirmation" shown in FIG. 9, the user can confirm the diagnostic service system information notified to the user from the diagnostic service system side. As the diagnostic service system information, there is important fault information (including bug information), recall information, version update information of the diagnostic service system 1, etc., for example. For example, in the case of an important fault necessitating recall occurring in the diagnostic service system itself, the service center or service center management can transmit recall information. The user can thereby instantaneously reference the transmitted recall information. In addition, the user can also confirm contacting such as for version update of the diagnostic service system. It should be noted that the diagnostic service system can also mail by a push system to the mobile telephone (or smartphone, etc.) of the user registered in advance, according to the severity of the diagnostic service system information, as a notification method of diagnostic service system information.

<Evaluation on Response>

FIG. 13 is a view showing an "evaluation information input screen" for inputting a user evaluation for the response from the diagnostic service system 1. By way of the evaluation information input screen, it becomes possible to carry out skill improvement of responders, and added learning of the knowledge system based on the input information from the user. The diagnostic service system menus have been explained above.

<Processing Flow of "2. Fault Diagnostic System" and "3. Knowledge Diagnostic System">

Next, the processing flow of the diagnostic service system 1 for a case of the user selecting the submenu "2. Fault Diagnostic System", and a case of selecting the submenu "3. Knowledge Diagnostic System" will be explained while referencing FIGS. 14 and 15.

(Case of User Selecting "3. Knowledge Diagnostic System")

Figure 14:
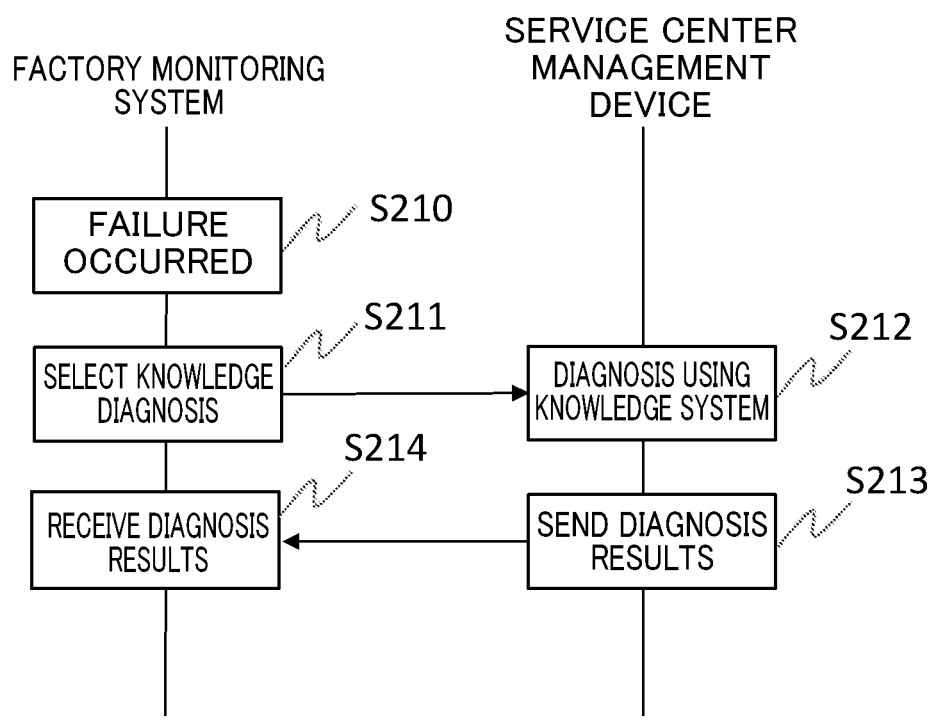
FIG. 14 is a view showing the flow of the diagnostic service system in a case of selecting a knowledge diagnostic system.

As shown in FIG. 14, in the case of an alarm of a machine tool occurring in Step S21, the user selects "3. Knowledge Diagnostic System" in Step S211 on the factory monitoring system 100-1. When "3. Knowledge Diagnostic System" is selected, the knowledge system 408 starts diagnosis based on the input from the user in Step S212. In Step S213, the knowledge system 408 sends the diagnosis results to the user when completing the diagnosis. In Step S214, the user acquires the diagnosis results from the knowledge diagnostic system.

(Case of User Selecting "2. Fault Diagnostic System")

Figure 15:
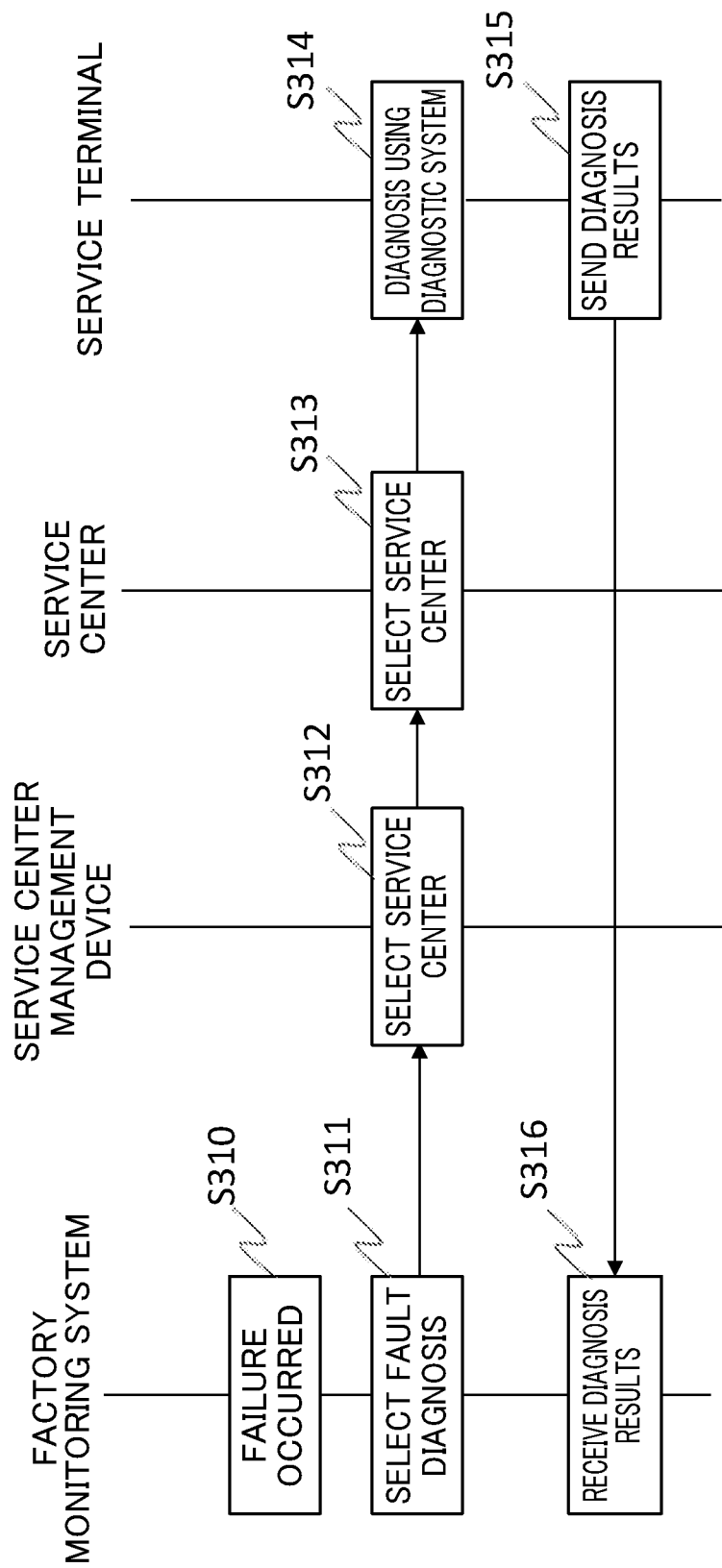
FIG. 15 is a view showing the flow of the diagnostic service system in a case of selecting a fault diagnostic system.

As shown in FIG. 15, in the case of an alarm of the machine tool occurring in Step S310, the user selects the fault diagnostic system, and inputs information into the interview sheet in Step S311. When this is done, the most suitable service center 600 is selected in Step S312, and the service center selected in Step S313 then selects the service terminal to which the most suitable responder belongs. The responder of the service terminal selected in Step S314 performs diagnosis using "3. Knowledge Diagnosis System", for example, and sends the diagnosis results to the factory monitoring system 100-1 in Step S315. The factory monitoring system 100-1 receives the diagnosis results in Step S316.

<Configuration and Operation of Service Terminal 700>

Next, the configuration of the service terminal 700, and terminal operations, including an operator on the service center side, etc., in the case of accepting the fault report from the user, for a case of the responder diagnosing this fault performing fault diagnosis of the machine, will be further explained using FIGS. 16 to 24.

Figure 2C:
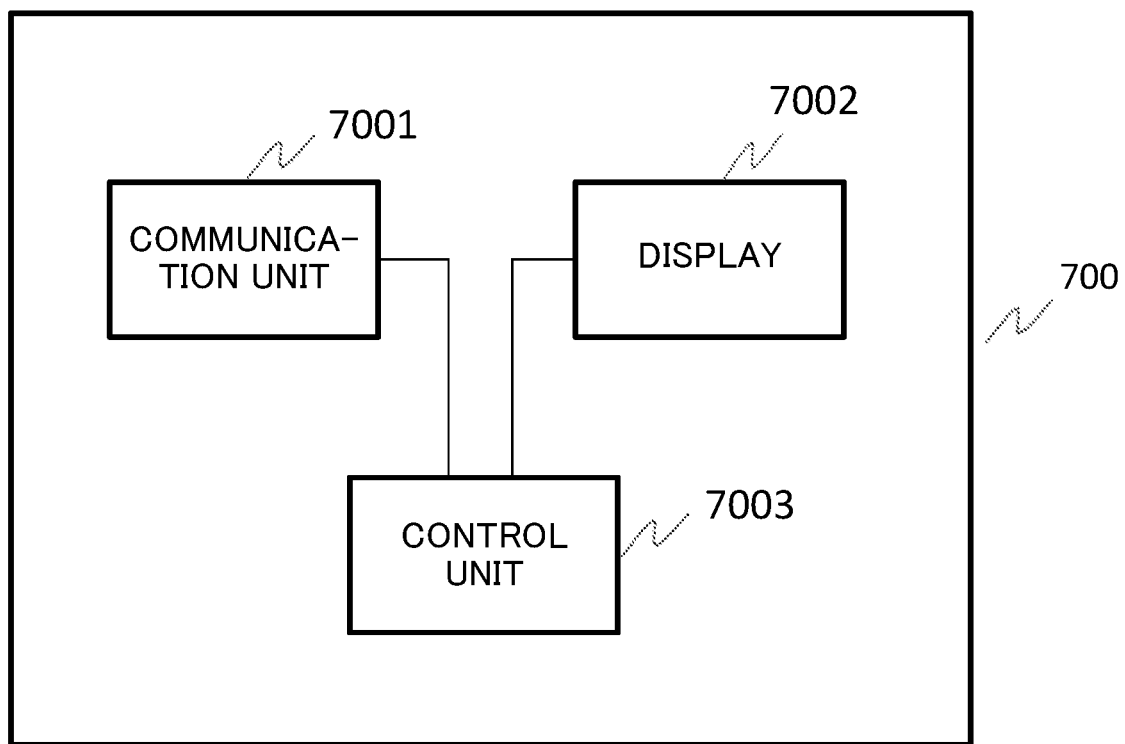
FIG. 2C is a block diagram showing the configuration of a service terminal 700.

FIG. 2C is a block diagram showing the configuration of the service terminal 700. The service terminal 700 includes a communication unit 7001 that communicates to the service control 601 via a network, a display 7002 such as a liquid crystal display that displays the screen information, etc. of FIGS. 17 to 23 sent from the service control 601, and a control unit 7003 that controls the communication unit 7001 and display 7002. The display 7002 includes a touch panel, and enables character input by a key operation screen being displayed; however, an input unit such as a separate keyboard may be provided. The control unit 7003 displays, on the display 7002, a screen of a fault diagnosis request (inquiry contents) shown in FIG. 16, which is transmitted from the service center management device 401. In addition, the control unit 7003 displays, on the display 7002, the screen information of FIGS. 17 to 23, transmitted from the service center management device 401, according to the manipulation of the touch panel or input unit. The data inputted via the touch panel or input unit is sent to the service center management device 401 via the service control 601 and service center 600. In addition, the service terminal 700 receives the required data from the service center management device 401 via the service center 600. It should be noted that, by the service center management device 401 (or service center 600) includes a Web server, and the service terminal 700 includes a Web browser, it may be configured so as to display and control the screens of FIGS. 17 to 23.

In the case of constituting the functions of the control unit of the service terminal 700 by software, the functions thereof can be realized by having programs encoding operations of the control unit 7003 of the service terminal 700 run by a computer. The computer is configured by a storage unit such as a hard disk and ROM storing the programs encoding the operations of the control unit 7003, DRAM storing data required in computations, a CPU, and a bus connecting each part. Then, it is possible to realize the functions of the control unit 7003 by storing the information required in computation in the DRAM of this computer, and causing this program to run by the CPU.

Figure 16:
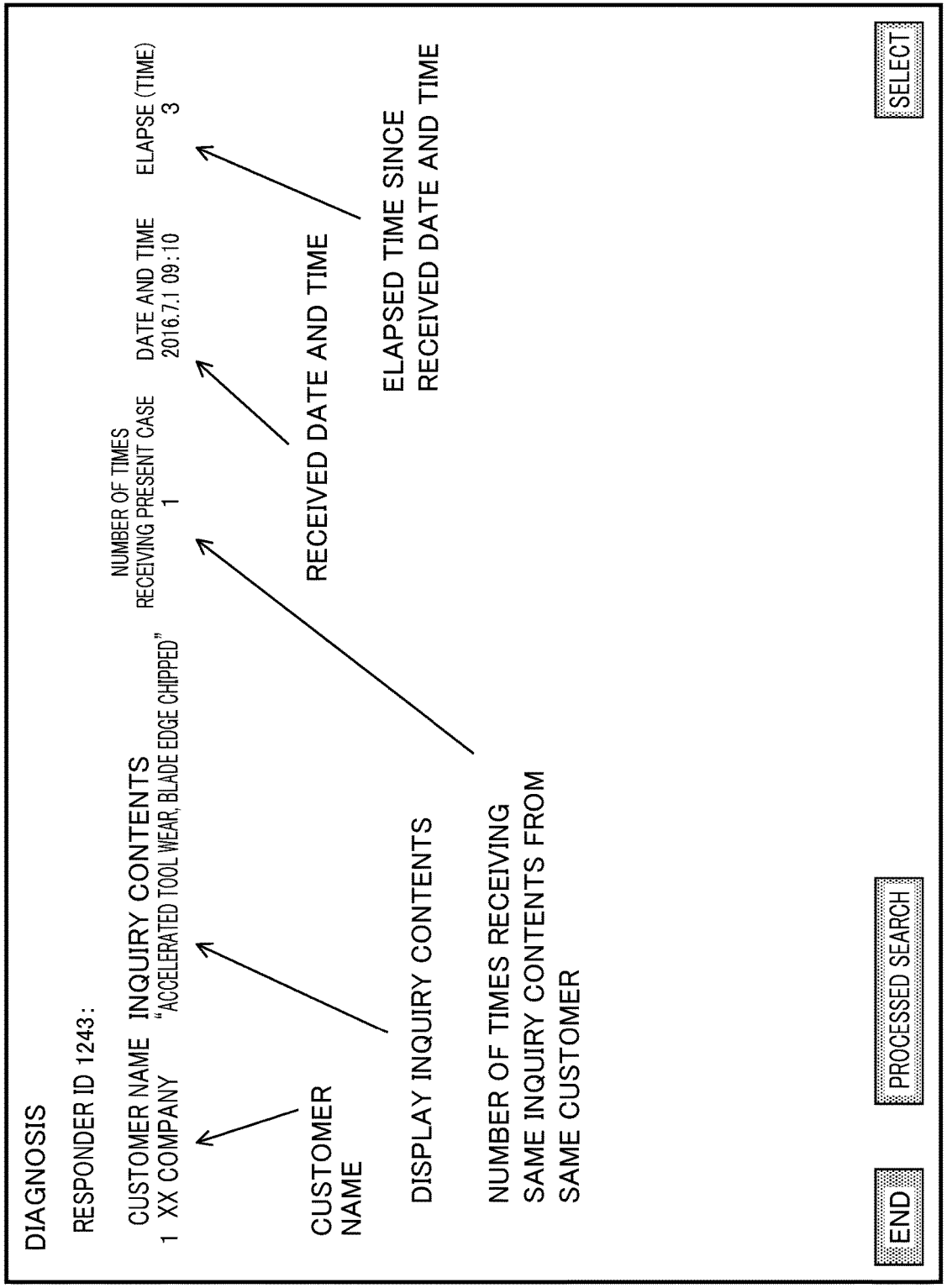
FIG. 16 is a view showing a diagnosis request screen displayed to a responder.
Figure 17:
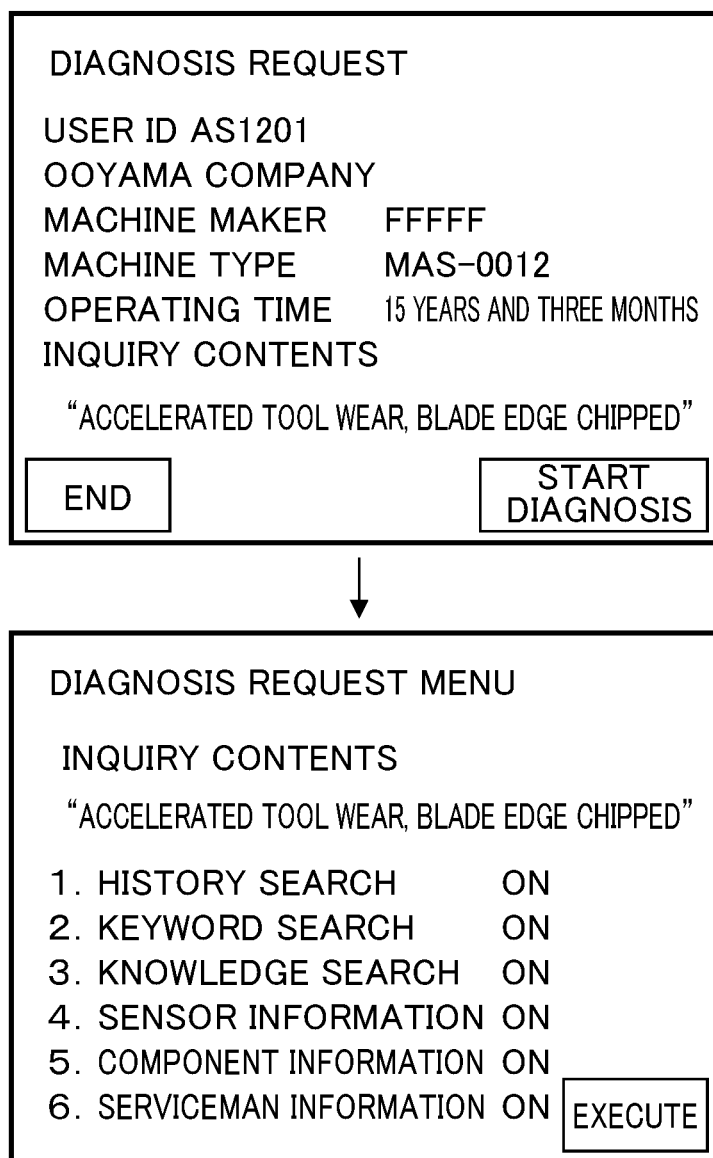
FIG. 17 is a view showing a screen of a diagnosis request menu.

The service terminal 700 provides a function that list displays fault diagnosis requests (inquiry contents) transmitted to this responder from the service control 601, as shown in FIG. 16. The responder can select an unanswered fault diagnosis request (inquiry contents) by selecting the select key. In addition, the responder can search fault diagnosis requests (inquiry contents) processed in the past by selecting the processed search key. When the responder selects a fault diagnosis request from a certain user from the list displayed fault diagnosis requests (inquiry contents), a screen of the fault diagnosis request from this user is displayed as shown in FIG. 17. When the responder selects the "diagnosis start" button, the screen of "diagnosis request menu" shown in FIG. 17 is displayed. The responder selects a function used for diagnosis, and selects the execute key. The screen of the diagnosis request menu shown in FIG. 17 displays history search, keyword search and knowledge search, sensor information, component information and field serviceman information as functions used for diagnosis. By doing this, the responder can perform fault diagnosis using these functions, it should be noted that the responder can also use the "Diagnosis Service System Menu" shown in FIG. 9.

The service terminal 700 provides a function of searching the history of fault diagnosis faults received thus far, as shown in FIG. 18. The service terminal 700 references the company name of the user and machine number, generates a past inquiry history list related to this machine from the customer service server 402, etc., and displays on the screen of "Diagnosis Request (history search)" as shown in FIG. 18. Herein, although the past fault display is set at one year, it is possible to arbitrarily select the number of years of the past fault display.

The service terminal 700 provides a keyword search function as shown in FIG. 19. As shown in FIG. 19, the service terminal 700 searches from the customer service server 402, etc. via the service center management device 401 for case examples thus far, based on the keyword (tool wear) inputted by the responder, and displays a list of case examples hitting this keyword (tool wear). It should be noted that the responder can select the search range such as machine maker and machine model. By doing this, a list of case examples hitting this keyword (tool wear) is displayed, and the responder is able to reference the details of a selected case example, by entering the number wanted to query and selecting the select key.

The service terminal 700 provides a knowledge search function, as shown in FIG. 20. As shown in FIG. 20, the service terminal 700 displays a screen for knowledge search, and automatically does keyword disaggregating analysis on the inquiry contents.

Keyword creation is performed by
1) a character string identical to index described in machine manual,
2) consecutive characters,
3) consecutive numbers, etc. In the present case example, "tool wear", "blade edge", etc. are keywords. Only the case examples that have been settled, and replied are selected. This is due to corresponding to automatic responses later. It should be noted that the knowledge search can be performed using the knowledge system 408.

The service terminal 700 provides a query function for sensor information arranged in the machine, as shown in FIG. 21. FIG. 21 is a view showing an example of a displayed screen for retrieving sensor information to be used as a reference in the keyword of the inquiry from the factory monitoring system 100. It should be noted that, in order to compare the delivery data of the factory or basic specification of the machine, it is possible to select on this screen the display period showing sensor information from when to when is displayed. The machine queried in FIG. 21, for example, is delivered with a sensor installed to the spindle part as shown in FIG. 24. FIG. 24 is an explanatory view showing a machine tool in which a sensor is installed to the spindle part. In FIG. 24, a spindle mechanism 4001 has a vibration sensor 4002 installed, and the vibration sensor 4002 measures acceleration and vibration amplitude. A tool (cutter) 4004 is installed to the spindle mechanism 4001 via a tool clamp 4003. A work 4005 is machined by the tool (cutter) 4004.

The service terminal 700 provides a search function of components, as shown in FIG. 22. FIG. 22 is a view showing an example of a screen showing component search results. In the search of components, the service terminal 700 searches repair components from repair results thus far by referencing the customer service server 402 via the service center management device 401, and determines the shipping availability of components from the factory data server 406.

The service terminal 700 provides a search function of dispatachable field servicemen, as shown in FIG. 23. FIG. 23 shows a screen showing a list of dispatchable field servicemen, and the service terminal 700 displays a list of dispatchable field servicemen by field servicemen having experience in spindle replacement from the field serviceman database of the service center 600.

By doing this, in the case of the responder determining that replacement of components and the dispatch of a field engineer for replacing components are necessary as a result of fault diagnosis, confirms from the service terminal 700 the inventory status of components from the component shipping center 500 and factory data server 406, and specifies a field serviceman suited to the category of the corresponding fault who can arrive the quickest, from the personnel dispatch center 501, and field serviceman position information system 407. Then, the responder can notify to the questioner (user) a response such as the component delivery date, arrangement of field serviceman, and arrival time. It should be noted that, in the case of the fault report route from the questioner (user) being mail or inquiry IP phone, the responder can notify the questioner (user) by mail or IP phone.

Although the diagnostic service system 1 has been explained above, the entirety or part of various servers included in the diagnostic service system 1 of the explained embodiment can be realized by hardware, software, or a combination thereof. Herein, realized by software indicates being realized by a computer reading and executing a program. In the case of constituting by hardware, a part or the entirety of the server can be constituted by integrated circuits (IC) such as LSI (Large Scale Integrated circuit), ASIC (Application Specific Integrated Circuit), gate array, and FPGA (Field Programmable Gate Array).

In the case of constituting the entirety or part of the functions equipped to the various servers included in the diagnostic server system 1 by software, the entirety or part of these functions can be realized by having programs encoding the entirety or part of the operations of various servers included in the diagnostic service system 1 run by a computer. The computer is configured by a storage unit such as a hard disk and ROM storing programs encoding the entirety or part of the operations of various servers, DRAM storing the data required in computation, a CPU, and a bus connecting each part. Then, in this computer, the information required in computation is stored in the DRAM, and the entirety or part of the functions equipped to the various servers can be realized by causing these programs to run by the CPU. In addition, it may be made a configuration in which each function equipped to the various servers included in the diagnostic service system 1 is executed on one or a plurality of servers as appropriate. In addition, each function equipped to the various servers included in the diagnostic service system 1 may be realized using a virtual server function, etc. on a cloud.

The program can be stored using various types of computer readable media, and provided to a computer. The computer readable media includes various types of tangible storage media. The computer readable media includes non-transitory computer readable media. Examples of computer readable media include magnetic recording media (for example, flexible disk, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)).

The effects according to the diagnostic service system 1 of the present embodiment explained above will be explained. By simply using the present diagnostic service system 1, the user can receive not only fault diagnosis, but also comprehensive machine maintenance information services of information such as maintenance history management, maintenance components, maintenance tools, etc. through a security shared network 300. In addition, the user is also able to easily perform information searches, due to the machine information stored in the factory monitoring system also encompassing the differences in manufacturer. The diagnostic service system 1 constitutes the total system of the factory monitoring system 100, service center management device 401, service center 600, service control 601, and service terminal 700. According to this configuration, it becomes possible to construct an exceptionally efficient system since differences in protocol due to unique sensor information and differences in machines shown in FIG. 3 can be absorbed by the diagnostic service system 1.

Since it is possible to construct a two-way private network, and exchange business information and technical information between users participating in the network of the diagnostic service system 1, safe, fast and accurate information exchange is possible. With the diagnostic service system 1, even if machines of different manufacturer are being used, since the communication specification and protocol use can be converted into global data by the factory monitoring system 100, it is possible to equivalently evaluate all machines. In addition, since the factory monitoring system 100 exchanges data, data exchange work by users is unnecessary and efficient evaluation management is possible. Upon inquiring, the user is able to transmit from various devices such as a factory terminal, smartphone, PC and IP phone, and since being managed by a security shared network, the transmission of information is efficient and safe.

Since the user can obtain various notifications and information from the service center 600 through the security shared network 300, it is unnecessary to manage logs such as fault history by him/herself, and thus is efficient. The user can receive the purchasing time of recommended maintenance components, etc., and purchase spare parts from the customer service server 402 through the security shared network 300 of the diagnostic service system 1. By way of this diagnostic service system 1, the user can easily perform preventive maintenance. Since the user can obtain various notifications and information from the service center 600 using the present diagnostic service system 1, it is unnecessary for the user to manage logs such as fault history his/herself, and thus is efficient. By the user using the computer of a conventional system, and using the present diagnostic service system 1 in addition to a system using machine logs in diagnosis, it is possible to minimize the access time to the operator, component preparation time, and dispatch time of the field serviceman.

Since the inquiry history of users or fault history can be automatically registered in the customer service server 402, it is possible to construct a customer-unique diagnostic system, or fault history system. Since factory data recorded in the factory data server 406 and sales data recorded in the sales data server 405 can be taken into account in diagnosis, the components being used can be decided in advance, and replacement component specification for recovery is easy and the time can be shortened. From the data of failed components accumulated in the customer service server 402 and operating status of the machine saved in the factory monitoring system 100, it is possible to create an index for the lifespan of failed components. Based on this index, it is possible to decrease failures by performing periodic maintenance inspections, and minimize downtime of the machine. Since the structure of system evaluation shown in FIG. 13 is inherent, it is possible to reinforce the knowledge system of fault diagnosis and easily improve responses of the responder.

Although the respective embodiments and examples of the present invention have been explained above, the present invention is not to be limited to the aforementioned respective embodiments and examples, and for one skilled in the art, it is possible to modify or change into various forms within a scope not departing from the gist of the present invention, based on the disclosure in the claims, and these modified examples or changed examples also fall under the scope of rights of the present invention.

EXPLANATION OF REFERENCE NUMERALS

100-1, 100-2, ..., 100-n factory monitoring system
104 inquiry mail
105 inquiry IP phone
200-1, 200-2, ..., 200-n machine
300 security shared network
401 service center management device
402 customer service server
403 manual server
404 SNS
405 sales data server
406 factory data server
407 field serviceman position information system
408 knowledge system
409 failure know-how database
500 component shipping center
501 personnel dispatch center
600-1, 600-2, ..., 600-n service center
601 service control
700-1, 700-2, ..., 700-n service terminal

What is claimed is:

1. A system including a plurality of machine tools and a factory monitoring system,
   the machine tool comprising:
   a motor;
   a ball screw configured to connect to the motor such that rotational motion of the motor is converted to linear motion of the ball screw;
   a table connected to the ball screw that moves linearly based on the linear motion of the ball screw; and
   a control device connected to the motor for detecting a rotational position of the motor and a use frequency within a stroke of the ball screw, the use frequency within the stroke of the ball screw being used for determining uneven wear of the ball screw,
   wherein the factory monitoring system detects uneven wear of the ball screw by summing each distribution of the use frequency sent from the plurality of machine tools.

2. The system according to claim 1, wherein the control device further comprising a position detector, wherein the use frequency is detected using the rotational position detected by the position detector and a load torque, or a number of time passing through an arbitrary segment in the ball screw.

3. The system according to claim 1, wherein the distribution of the use frequency is periodically sent from the machine tools.

4. A factory monitoring method of a system including a plurality of machine tools and a factory monitoring system,
   each machine tool comprising:
   a motor;
   a ball screw configured to connect to the motor such that rotational motion of the motor is converted to linear motion of the ball screw;
   a table connected to ball screw; and
   a control device connected to the motor and including a position detector,
   the method comprising:
   detecting, by each machine tool, a use frequency within a stroke of the ball screw, based on the rotational position detected by the position detector and a load torque, or a number of times passing through an arbitrary segment in the ball screw for determining uneven wear of the ball screw; and
   detecting, by the factory monitoring system, uneven wear of the ball screw by summing each distribution of the use frequency sent from the plurality of the machine tools.

5. The factory monitoring method according to claim 4, wherein the distribution of the use frequency is sent periodically.

* * * * *